US009195319B2

(12) United States Patent
Matsuda

(10) Patent No.: US 9,195,319 B2
(45) Date of Patent: Nov. 24, 2015

(54) SIGNAL PROCESSING DEVICE AND SEMICONDUCTOR DEVICE FOR EXECUTING A PLURALITY OF SIGNAL PROCESSING TASKS

(71) Applicant: Renesas Electronics Corporation, Kawasaki (JP)

(72) Inventor: Keisuke Matsuda, Kawasaki (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 298 days.

(21) Appl. No.: 13/748,390

(22) Filed: Jan. 23, 2013

(65) Prior Publication Data

US 2013/0215020 A1   Aug. 22, 2013

(30) Foreign Application Priority Data

Feb. 17, 2012   (JP) ................................ 2012-032685

(51) Int. Cl.
*G06F 9/46*   (2006.01)
*G06F 3/03*   (2006.01)

(52) U.S. Cl.
CPC . *G06F 3/03* (2013.01); *G06F 9/461* (2013.01)

(58) Field of Classification Search
CPC .......... G06F 9/461; G06F 3/03; G06F 9/3851
See application file for complete search history.

(56) References Cited

U.S. PATENT DOCUMENTS

| 5,600,837 | A * | 2/1997 | Artieri ......................... 718/103 |
| 6,128,641 | A * | 10/2000 | Fleck et al. .................. 718/108 |
| 6,470,376 | B1 * | 10/2002 | Tanaka et al. ................ 718/108 |
| 6,671,762 | B1 * | 12/2003 | Soni et al. ..................... 710/267 |
| 6,895,583 | B1 * | 5/2005 | Koning ......................... 718/100 |
| 7,055,151 | B1 * | 5/2006 | Joffe et al. .................... 718/104 |
| 7,434,222 | B2 * | 10/2008 | Reid ............................. 718/107 |
| 2006/0044420 | A1 | 3/2006 | Iguchi et al. |
| 2007/0168649 | A1 * | 7/2007 | Anderson et al. ............ 712/214 |
| 2009/0196356 | A1 | 8/2009 | Houki |

FOREIGN PATENT DOCUMENTS

| JP | 2006-197548 A | 7/2006 |
| JP | 2009-086789 A | 4/2009 |
| WO | WO 2007/032123 A1 | 3/2007 |

OTHER PUBLICATIONS

Japanese Office Action dated May 21, 2015 with English Translation.

* cited by examiner

*Primary Examiner* — Van Nguyen
(74) *Attorney, Agent, or Firm* — McGinn IP Law Group, PLLC

(57) ABSTRACT

To restrain the amount of information to be saved to the minimum necessary and suppress temporal overhead required for save and return when task switching associated with a priority processing request occurs in a signal processing device for performing multitasking on stream data such as image signals, the signal processing device includes a pointer indicating position information of data in stream data according to progress of processing by a signal processing unit. When priority task processing is requested, the signal processing device saves only a pointer value. At the time of return, based on the saved pointer value the signal processing device obtains position information of output stream data to be outputted next in a returned task, obtains position information, in an input stream, of head input data of all input data that needs to be inputted to the signal processing unit to calculate the data, and resumes the processing.

20 Claims, 15 Drawing Sheets

SIGNAL PROCESSING DEVICE AND SEMICONDUCTOR DEVICE FOR EXECUTING A PLURALITY OF SIGNAL PROCESSING TASKS

CROSS-REFERENCE TO RELATED APPLICATIONS

The disclosure of Japanese Patent Application No. 2012-032685 filed on Feb. 17, 2012 including the specification, drawings and abstract is incorporated herein by reference in its entirety.

BACKGROUND

The present invention relates to a device and an LSI for executing a plurality of signal processing tasks, and particularly to a technique effective in suppressing overhead associated with task switching to priority processing.

In digital devices for processing images such as cellular phones, digital cameras, and car navigation systems, there is a tendency that image resolutions become higher and functions become more sophisticated and complex; accordingly, LSI etc. for performing signal processing on stream data such as images are required to execute a plurality of image processing tasks. At this time, in signal processing devices, task switching associated with a priority processing request occurs, and overhead associated with the task switching is required to be suppressed. The task switching associated with a priority processing request refers to an operation for receiving a request for priority processing of a further task during the execution of a current task, suspending the currently running task, executing the priority task, and returning to the original task after the completion of the priority processing. In general, a method called a context switch is used for task switching. The context switch is a method for saving the value and state of a register which is information about the progress of the running task at the time of task switching, switching tasks to execute priority processing, and restoring the saved information to resume the original task after the completion of the priority processing. Since the task of signal processing of stream data such as images deals with an enormous amount of information in comparison with ordinary software, it takes a great deal of time to save the progress of the running task into a memory and return, which disadvantageously increases overhead.

In particular, image processing is often performed in units of frames, and notification such as an interrupt is made every time the image processing of one frame is completed and acts as a trigger so that a system performs various kinds of processing. Higher resolution (bigger size) of processed images and complication of image processing are further increasing processing time and data amount per frame. Accordingly, it takes a greater deal of time to save the progress of the running task of image processing into a memory and return, which disadvantageously further increases overhead.

Japanese Unexamined Patent Publication No. 2009-86789 describes in paragraph 0007 that in image processing, due to a large amount of data to be processed in a collective manner (e.g., images for one screen), a context switch cannot be performed (very inefficient if not impossible). For multitask image processing, a plurality of image processing devices are provided and operated in parallel for scheduling for preventing the occurrence of context switching.

Japanese Unexamined Patent Publication No. 2006-197548 discloses a technique for performing display on a priority basis in compression processing in an image pickup device in which image data acquired by shooting is compressed by an image processing unit and stored. In the device, the image processing unit is not used for display; therefore, by stopping the image processing unit during the display on a priority basis, the middle state of processing is maintained, and after return from priority processing, the image processing unit can be resumed as it is. That is, a context switch does not occur in the image processing unit.

SUMMARY

In an embodiment disclosed in the present application, it is an object to restrain the amount of information to be saved to the minimum necessary and suppress temporal overhead required for save and return when task switching associated with a priority processing request occurs in a signal processing device for performing multitasking on stream data.

The above and other objects and novel features of the present invention will become apparent from the description of this specification and the accompanying drawings.

A typical embodiment disclosed in the present application will be briefly described as follows.

A signal processing device includes a pointer indicating position information of data in stream data according to progress of processing by a signal processing unit. When priority task processing is requested, the signal processing device saves only a pointer value. At the time of return, based on the saved pointer value the signal processing device obtains position information of output stream data to be outputted next in a returned task, obtains position information, in an input stream, of head input data of all input data that needs to be inputted to the signal processing unit to calculate the data, and resumes the processing.

An effect obtained by the typical embodiment disclosed in the present application will be briefly described as follows.

The amount of information to be saved is only the pointer value which is the minimum necessary, and an enormous amount of information is not saved and returned, which makes it possible to suppress temporal overhead required for save and return.

DETAILED DESCRIPTION

1. Outline of Embodiments

Figure 1:
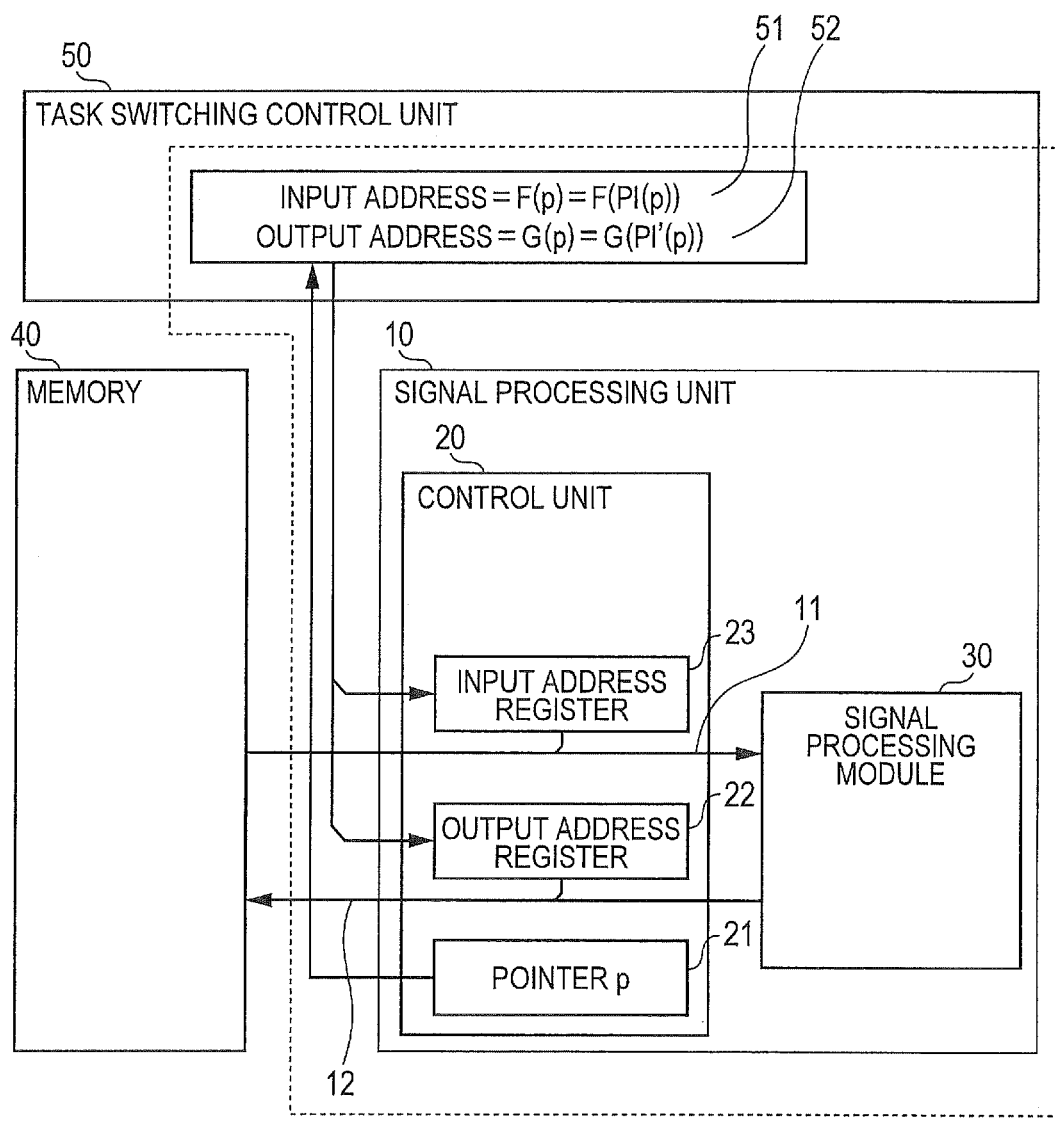
FIG. 1 is a functional block diagram of a signal processing device according to a first embodiment.

First, exemplary embodiments of the invention disclosed in the present application will be outlined. Reference numerals in the drawings that refer to with parentheses applied thereto in the outline description of the exemplary embodiments are merely illustration of ones contained in the concepts of components marked with the reference numerals.

[1] Saving of Only Pointer and Calculation of Position of Head Input Data after Return based on Pointer A signal processing device including a signal processing unit (10) which receives an input stream (11) comprised of a plurality of pieces of input data, executes a predetermined task on stream data, and outputs an output stream (12) comprised of a plurality of pieces of output data, operates as follows.

Input data of the input stream is sequentially inputted to the signal processing unit, and output data configuring the output stream is sequentially outputted from the signal processing unit. The signal processing device includes a pointer (21) indicating position information of data in the stream data according to progress of processing by the signal processing unit.

When priority processing of a second task is requested during execution of a first task (81), the signal processing device executes the second task (86) after saving a value held by the pointer (84).

Upon completion of the second task (87), based on the saved pointer value the signal processing device obtains position information, in the output stream, of output data to be outputted next in the first task (90), and obtains position information, in the input stream, of head input data of all input data that needs to be inputted to the signal processing unit to calculate the output data to be outputted next (90).

Therefore, the amount of information to be saved is only the pointer value which is the minimum necessary, an enormous amount of information is not saved and returned, and the position information of input data necessary to resume signal processing after return is calculated only from the pointer value, which makes it possible to suppress temporal overhead required for save and return.

[2] Input and Output Position Functions and Input and Output Address Functions

The signal processing device according to item 1 further includes a memory (40) for storing the input stream and writing the output stream and a task switching control unit (50), and operates as follows.

The signal processing unit includes an input address register (23) and an output address register (22). The input address register holds an address, in the memory, of the input data which the signal processing unit reads, and the output address register holds an address, in the memory, of the output data which the signal processing unit writes.

Upon completion of the second task, the task switching control unit calculates position information in the output stream of the output data to be outputted next in the first task, with an output position function based on the saved pointer value, calculates an address in the memory of the output data to be outputted next, with an output address function (52) based on an output of the output position function, and writes the address to the output address register.

Upon completion of the second task, the task switching control unit calculates position information in the input stream of the head input data, with an input position function based on the saved pointer value, calculates an address in the memory of the head input data, with an input address function (51), and writes the address to the input address register.

This simplifies address calculation by the task switching control unit.

[3] Pointer Holds Outputted Line Number or the Like

In item 2, the stream data is image data, and the pointer holds a pixel number, a line number, a block number, a frame number, or a combination thereof in the output stream of output data which has been outputted by the signal processing unit.

The output position function calculates a pixel number, a line number, a block number, a frame number, or a combination thereof of the output data to be outputted next in the first task based on the saved pointer value.

The input position function calculates a pixel number, a line number, a block number, a frame number, or a combination thereof in the input stream of the head input data based on the saved pointer value.

This enables the output position function to only add one to the saved pointer value for output and therefore be simplified.

[4] Pointer Holds Inputted Line Number or the Like

In item 2, the stream data is image data, and the pointer holds a pixel number, a line number, a block number, a frame number, or a combination thereof in the input stream of input data which has been outputted by the signal processing unit.

The output position function calculates a pixel number, a line number, a block number, a frame number, or a combination thereof of the output data to be outputted next in the first task based on the saved pointer value.

The input position function calculates a pixel number, a line number, a block number, a frame number, or a combination thereof in the input stream of the head input data based on the saved pointer value.

This enables the input position function to only add one to the saved pointer value for output and therefore be simplified.

[5] Position Function is Configured by Nesting Part Position Functions

In item 2, 3, or 4, the first task is a signal processing task including a plurality of pieces of signal processing in which an output stream obtained by performing signal processing on the input stream by the signal processing unit is an input stream of next signal processing in sequence, and operates as follows.

Each signal processing has a part position function for outputting position information of head input data of all input data that needs to be inputted to the signal processing unit to calculate output data to be outputted next. The saved pointer value is inputted to a part position function corresponding to signal processing executed last, in the first task, of the plurality of pieces of signal processing, and an output of a part position function corresponding to signal processing executed subsequently, in the first task, of the plurality of pieces of signal processing is inputted to a part position function corresponding to signal processing executed immediately previously, thus performing nesting in sequence to configure the input position function.

With this, even if signal processing is a combination of a plurality of pieces of signal processing, it is possible to appropriately configure the input position function and the output position function.

[6] Spatial Filtering (FIR Filter)

In item 5, the stream data is image data, and signal processing performed by the signal processing unit is n×n spatial filtering (n is an odd number equal to or greater than three). A part position function corresponding to the spatial filtering inputs a line number whose output is completed and outputs a line number (n−1)/2 line before the saved pointer value. The input position function includes the part position function corresponding to the spatial filtering.

This makes it possible to provide an embodiment in which signal processing includes image spatial filtering.

[7] Flip-Vertical Processing

In item 5, the stream data is image data, and signal processing performed by the signal processing unit is flip-vertical processing of an image of a vertical size V for reading an input stream on the (V−n+1)th line from a head and outputting the input stream on the nth line from the head. The pointer holds a line number p whose output is completed in the flip-vertical processing. A part position function corresponding to the flip-vertical processing outputs the (V−p)th line.

This makes it possible to provide an embodiment in which signal processing includes image flip-vertical processing.

[8] Task Switching in Multiple Priority Processing

In any one of items 1 to 7, the operation is as follows.

When priority processing of the second task is requested during execution of the first task, the signal processing device executes the second task after saving a first value held by the pointer. Further, when priority processing of a third task is requested during execution of the second task, the signal processing device executes the third task after saving a second value held by the pointer.

Upon completion of the third task, based on the saved second value of the pointer the signal processing device obtains position information of output data to be outputted next in the second task and resumes the second task. Further, upon completion of the second task, based on the saved first value of the pointer the signal processing device obtains position information of output data to be outputted next in the first task and resumes the first task.

This enables task switching in multiple priority processing.

[9] Semiconductor Device

A semiconductor device in which a CPU (45), a memory (40), and a signal processing unit (10) are coupled to a bus (55) is configured as follows.

The signal processing unit includes a signal processing module (30) and a signal processing control unit (20).

The signal processing module receives an input stream (11) comprised of a plurality of pieces of input data, executes predetermined signal processing on stream data, and outputs an output stream (12) comprised of a plurality of pieces of output data.

The signal processing control unit includes a pointer (21) indicating position information, in the stream data, of processing data according to progress of processing by the signal processing module, reads the input data from the memory by specifying a read address and inputs the input data to the signal processing module, and outputs the output data of the signal processing module to the memory by specifying a write address.

When priority processing of a second task is requested during execution of a first task, the CPU allows the signal processing unit to execute the second task after saving a value held by the pointer. Upon completion of the second task, the CPU returns the saved pointer value, and based on the returned pointer value, obtains an address in the memory to store output data to be outputted next in the first task and sets the write address. Further, the CPU obtains an address for storing head input data of all input data that needs to be inputted to the signal processing unit to calculate the output data to be outputted next and sets the read address.

This makes it possible to provide the semiconductor device for suppressing temporal overhead required for save and return.

[10] CPU Controls Task Switching

In item 9, the signal processing control unit includes a read address register (23) for holding the read address, a write address register (22) for holding the write address, and a pointer (21) register for holding the pointer value.

When the priority processing is requested, the CPU saves a first value of the pointer register into the memory.

Upon completion of the second task, the CPU returns the first value from the memory to the pointer register. Further, the CPU calculates position information in the output stream of the output data to be outputted next in the first task, with an output position function based on the first value, calculates an address in the memory of the output data to be outputted next in the first task, with an output address function based on an output of the output position function, and writes the address to the write address register. Further, the CPU calculates position information in the input stream of the head input data, with an input position function based on the first value, calculates an address in the memory of the head input data, with an input address function, and writes the address to the read address register.

This simplifies address calculation by the task switching control unit.

[11] Signal Processing Parameter Register

In item 9 or 10, the signal processing control unit further includes a parameter register (24). The signal processing module executes signal processing in accordance with a parameter held by the parameter register. When the priority processing is requested, the CPU discards a value held by the parameter register without save, and writes a parameter for allowing the signal processing module to execute the second task to the parameter register.

With this, since a signal processing parameter is not saved, it is possible to suppress temporal overhead required for save and return.

[12] Transfer of Signal Processing Parameter from Memory

In item 11, the memory stores the parameter for each processing content of processing executed by the signal processing module. When a processing task is requested, the CPU reads the parameter corresponding to processing content of the processing task from the memory, and writes the parameter to the parameter register.

This simplifies the management of the signal processing parameter.

[13] Context Processing Unit

A semiconductor device in which a CPU (45), a memory (40), a signal processing unit (10), and a context processing unit (70) are coupled to a bus (55) is configured as follows.

The signal processing unit includes a signal processing module (30) and a signal processing control unit (20).

The signal processing module receives an input stream (11) comprised of a plurality of pieces of input data, executes predetermined signal processing on stream data, and outputs an output stream (12) comprised of a plurality of pieces of output data.

The signal processing control unit includes a pointer (21) indicating position information, in the stream data, of processing data according to progress of processing by the signal processing module, reads the input data from the memory by specifying a read address (23) and inputs the input data to the signal processing module, and outputs the output data of the signal processing module to the memory by specifying a write address (22).

The context processing unit includes a context position storage unit (72) and a restoration unit (73).

When priority processing of a second task is requested during execution of a first task, the context processing unit allows the signal processing unit to execute the second task after saving a value held by the pointer into the context position storage unit. Upon completion of the second task, the context processing unit returns the saved pointer value.

Based on the returned pointer value, the restoration unit obtains an address in the memory to store output data to be outputted next in the first task and sets the write address, and obtains an address for storing head input data of all input data that needs to be inputted to the signal processing unit to calculate the output data to be outputted next and sets the read address.

This makes it possible to suppress temporal overhead required for save and return and execute task switching without placing a load on the CPU.

[14] Task Switching Control by Context Switch Unit

In item 13, the signal processing control unit includes a read address register (23) for holding the read address, a write address register (22) for holding the write address, and a pointer register (21) for holding the pointer value, and operates as follows.

When the priority processing is requested, the context processing unit saves a first value of the pointer register into the context position storage unit.

Upon completion of the second task, the context processing unit returns the first value from the context position storage unit to the pointer register. Further, the restoration unit calculates position information in the output stream of the output data to be outputted next in the first task, with an output position function based on the first value, calculates an address in the memory of the output data to be outputted next in the first task, with an output address function based on an output of the output position function, and writes the address to the write address register. Further, the restoration unit calculates position information in the input stream of the head input data, with an input position function based on the first value, calculates an address in the memory of the head input data, with an input address function, and writes the address to the read address register.

This simplifies address calculation by the task switching control unit.

[15] Signal Processing Parameter Register

In item 13 or 14, the signal processing control unit further includes a parameter register (24). The signal processing module executes signal processing in accordance with a processing parameter held by the parameter register.

When the priority processing is requested, the restoration unit discards a value held by the parameter register without save, and writes a processing parameter for allowing the signal processing module to execute the second task to the parameter register.

With this, since a signal processing parameter is not saved, it is possible to suppress temporal overhead required for save and return.

[16] Context Processing Unit Transfers Signal Processing Parameter from Memory

In item 15, the memory stores the processing parameter for each content of processing executed by the signal processing module. When a task is requested, the restoration unit transfers the processing parameter corresponding to processing content of the task from the memory to the parameter register.

This simplifies the management of the signal processing parameter.

[17] Association of Context Number with Pointer

In any one of items 13 to 16, the operation is as follows.

When priority processing of a second task is requested during execution of a first task, the context processing unit associates and saves a context number of the first task with a value held by the pointer into the context position storage unit. Upon completion of the second task, the restoration unit sets the write address and the read address, based on the saved context number and the returned pointer value.

This simplifies return processing.

[18] Return of Signal Processing Parameter

In item 17, the memory stores the processing parameter for each content of processing executed by the signal processing module. Upon completion of the priority processing, the restoration unit transfers the processing parameter corresponding to processing content of the first task from the memory to the parameter register, based on the saved context number.

This simplifies the management of the signal processing parameter.

[19] Multiple Priority Processing

In item 18, the operation is as follows.

When priority processing of the second task is requested during execution of the first task, the context processing unit associates and saves a context number of the first task with a pointer value of the first task held by the pointer into the context position storage unit.

When priority processing of a third task is requested during execution of the second task, the context processing unit associates and saves a context number of the second task with a pointer value of the second task held by the pointer into the context position storage unit.

Upon completion of the third task, the restoration unit returns the processing parameter of the second task and restores the pointer value of the second task, based on the context number of the second task. Further, upon completion of the second task, the restoration unit returns the processing parameter of the first task and restores the pointer value of the first task, based on the context number of the first task.

This enables multiple priority processing.

2. Details of Embodiments

Embodiments will be described in greater detail below.

First Embodiment

The configuration of a signal processing device according to a first embodiment will be described. FIG. 1 is a functional block diagram of the signal processing device according to the first embodiment.

The signal processing device according to the first embodiment includes a signal processing unit 10 which receives an input stream 11 comprised of a plurality of pieces of input data, executes a predetermined task on stream data, and outputs an output stream 12 comprised of a plurality of pieces of output data, and operates as follows.

Input data configuring the input stream 11 is sequentially inputted to the signal processing unit 10, and output data configuring the output stream 12 is sequentially outputted from the signal processing unit 10. The signal processing unit 10 includes a pointer 21 indicating position information of data in the stream data according to the progress of signal processing.

When priority processing of a second task is requested during the execution of a first task, the signal processing device executes the second task after saving a value held by the pointer 21. Upon completion of the second task, based on the saved pointer value the signal processing device obtains position information, in the output stream 12, of output data to be outputted next in the first task, and obtains position information, in the input stream 11, of head input data of all input data that needs to be inputted to the signal processing unit 10 to calculate the output data.

The position information of the input data and the output data can be calculated by functions (51, 52) with the saved pointer value p as inputs, respectively.

In FIG. 1, the section within the broken line is an essential part of the first embodiment.

The signal processing device includes a memory 40 for storing the input stream 11 and writing the output stream 12 and a task switching control unit 50, and a control unit 20 in the signal processing unit 10 includes an input address register 23 and an output address register 22, as shown in FIG. 1. The input address register 23 holds an address, in the memory 40, of input data which the signal processing unit 10 reads, and the output address register 22 holds an address, in the memory 40, of output data which the signal processing unit 10 writes. The signal processing unit 10 further includes a signal processing module 30. The signal processing module 30 receives the input data stream 11 specified by the input address register 23 in the signal processing unit 10, performs set signal processing, and writes the output data stream 12 to an address specified by the output address register 22.

The operation of the functions (51, 52) for obtaining the position information of the input data and the output data with the saved pointer value as inputs at the time of resuming the original processing after the completion of the priority processing can be implemented as the function of the task switching control unit 50.

Figure 2:
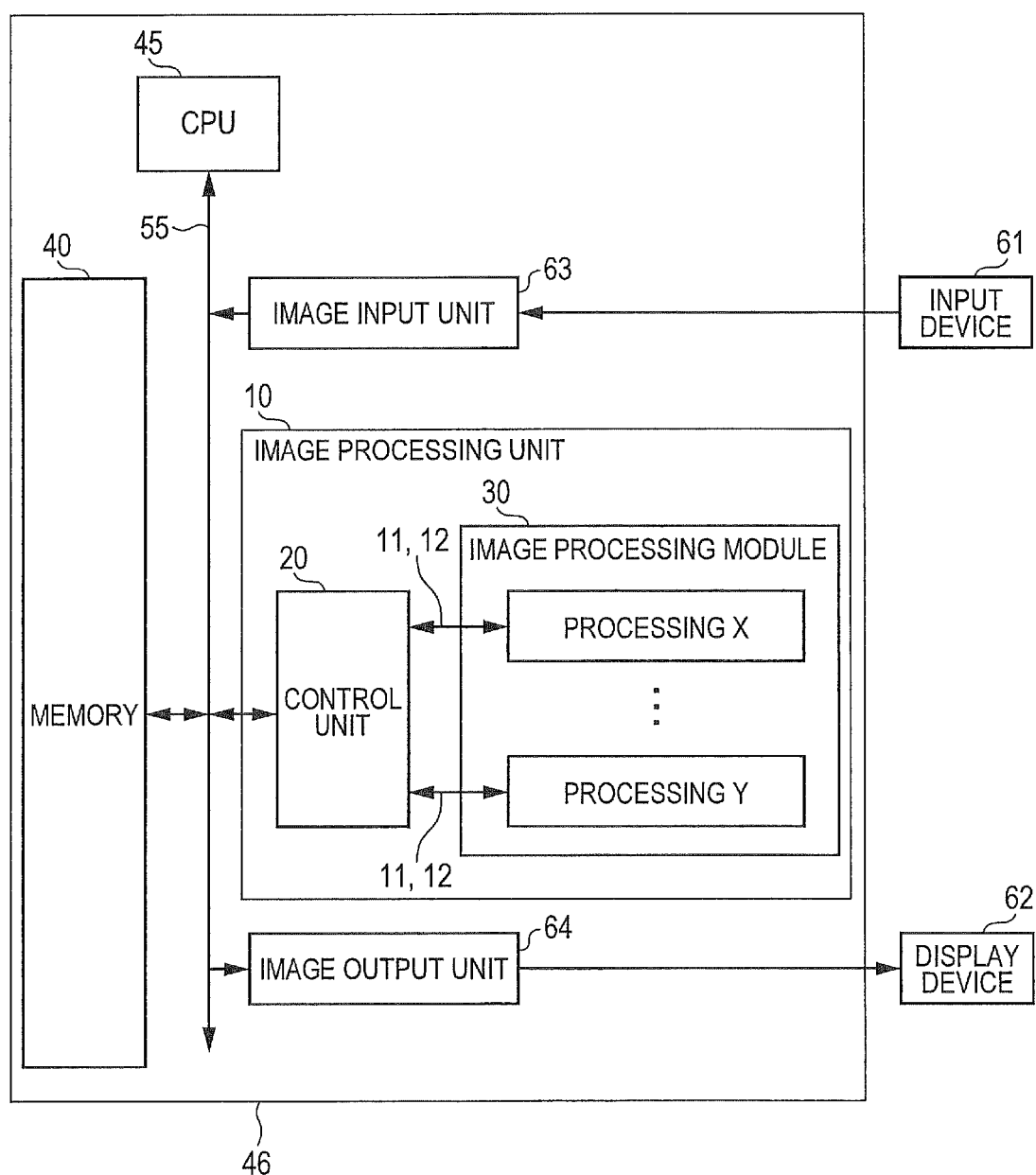
FIG. 2 is a block diagram of a semiconductor device according to the first embodiment.
Figure 15:
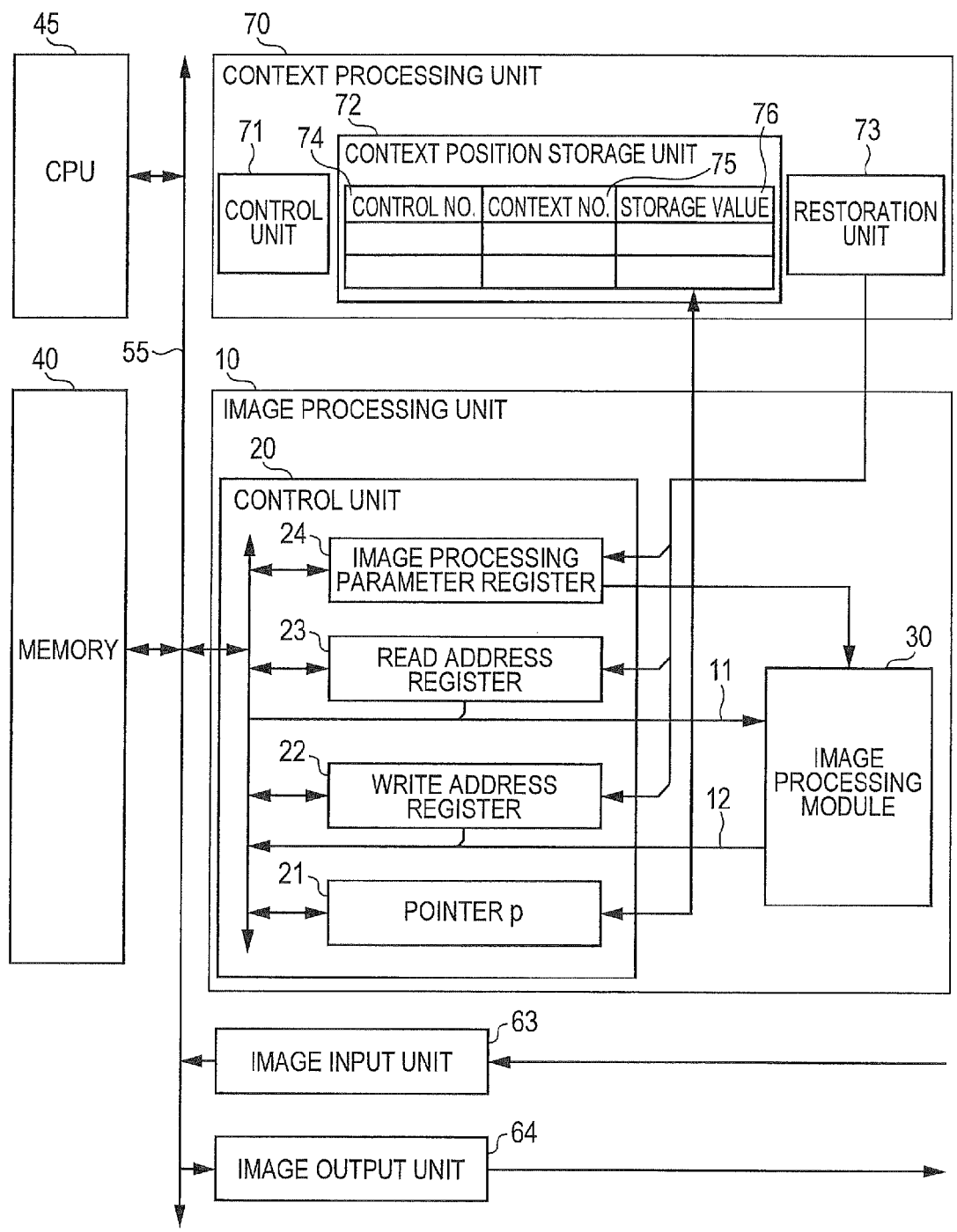
FIG. 15 is a block diagram of a semiconductor device including a context processing unit.

The signal processing device can be implemented by a semiconductor device such as shown in FIG. 2 or FIG. 15. Embodiments by the semiconductor device will be described later.

The operation of the signal processing device according to the first embodiment will be described.

Figure 3:
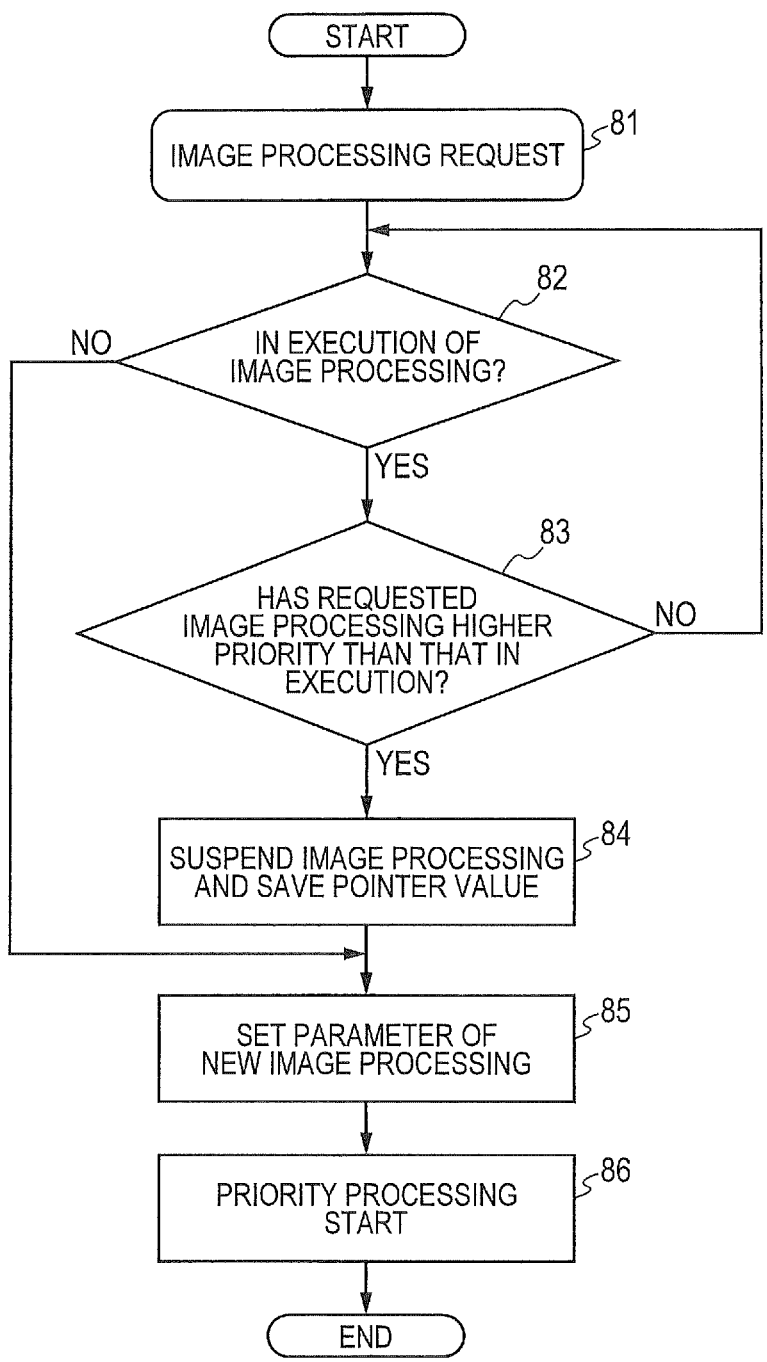
FIG. 3 is a flowchart showing a processing flow when a request for the execution of a further signal processing task is received during the execution of a signal processing task.
Figure 4:
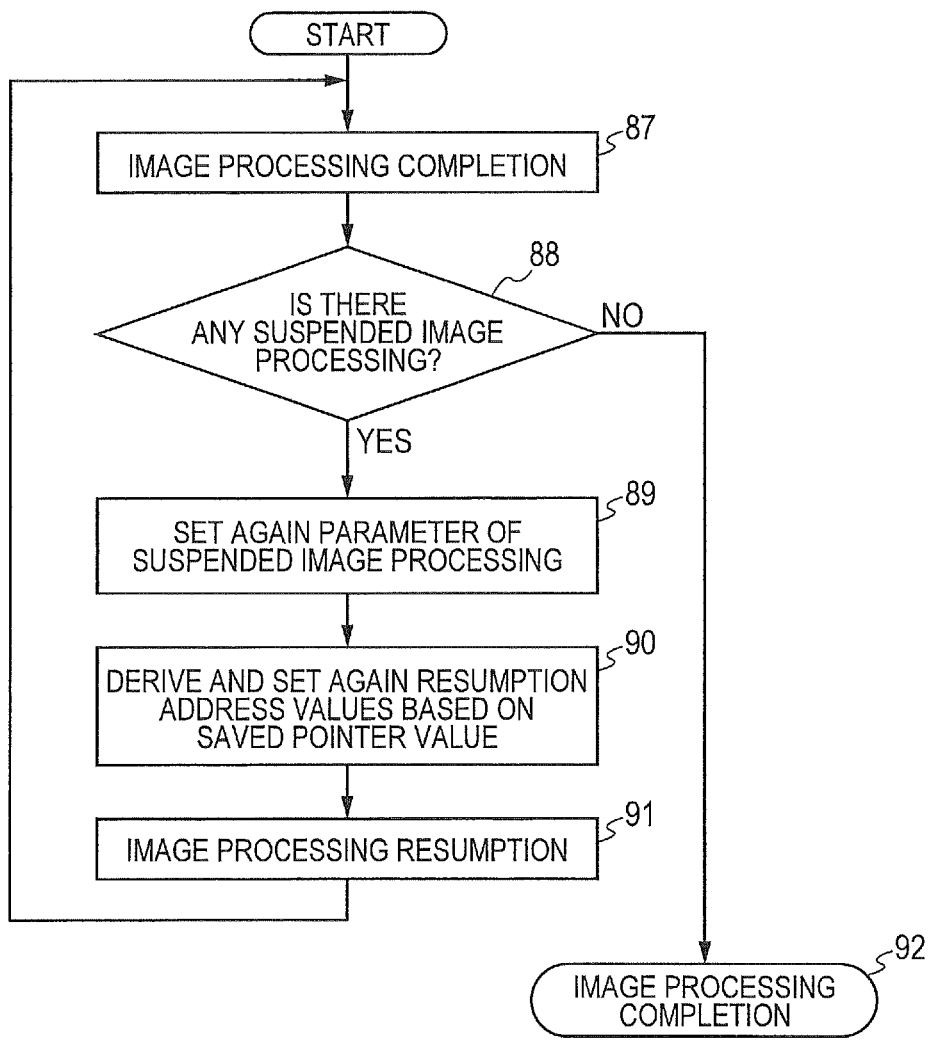
FIG. 4 is a flowchart showing a processing flow at the time of resuming original signal processing after the completion of priority processing.

FIG. 3 is a flowchart showing a processing flow when a request for the execution of a further signal processing task is received during the execution of a signal processing task. FIG. 4 is a flowchart showing a processing flow at the time of resuming original signal processing after the completion of priority processing. This is an example in which the signal processing task is image processing, but can be applied to signal processing in general in which time-series data as input data is sequentially inputted and undergoes predetermined processing, and time-series data of the same type as the input data is sequentially outputted. This is because in the predetermined processing, if the position of data to be outputted is provided, input data necessary to calculate the data is uniquely determined, so that head input data to be resumed to output the data can be derived by a function or the like.

When priority processing of an image processing task (second task) is requested (step 81), it is determined whether or not another image processing task (first task) is already in execution (step 82). If the first task is in execution when the priority processing of the second task is requested, it is determined which of the first and second tasks has a higher priority (step 83). If the second task has a higher priority, the image processing of the first task is suspended, and the value of the pointer 21 is saved (step 84). Then, a parameter for executing the image processing of the second task is set (step 85), and the processing starts (step 86).

On the other hand, if the second task has a lower priority, the second task waits in step 82 until the first task ends. After the first task ends, a parameter for executing the image processing of the second task is set (step 85), and the processing of the second task starts (step 86).

Upon completion of the image processing of the second task (step 87), it is determined whether or not the suspended image processing task is requested (step 88). If the suspended image processing task is not requested, the image processing ends (step 92). On the other hand, if the suspended image processing task is requested, a parameter for executing the suspended task is set again (step 89). Further, the pointer value saved in step 84 is read, and an input address and an output address for resuming the suspended task are obtained based on the value (step 90). The output address can be derived, based on the saved pointer value, i.e., by obtaining position information in the output stream 12 of output data to be outputted next in the first task based on the saved pointer value and converting it into an address in the memory for storing the data. The input address can be derived, based on the saved pointer value, as an address of head input data of all input data that needs to be inputted to the signal processing unit 10 to calculate the output data.

Then, the suspended first image processing task is resumed (step 91).

Therefore, the amount of information to be saved is only the pointer value which is the minimum necessary, an enormous amount of information is not saved and returned, and the position information of input data necessary to resume signal processing after return is calculated only from the pointer value, which makes it possible to suppress temporal overhead required for save and return.

The operation of the signal processing device according to the first embodiment will be described in greater detail with reference to FIGS. 5 to 7.

Figure 5:
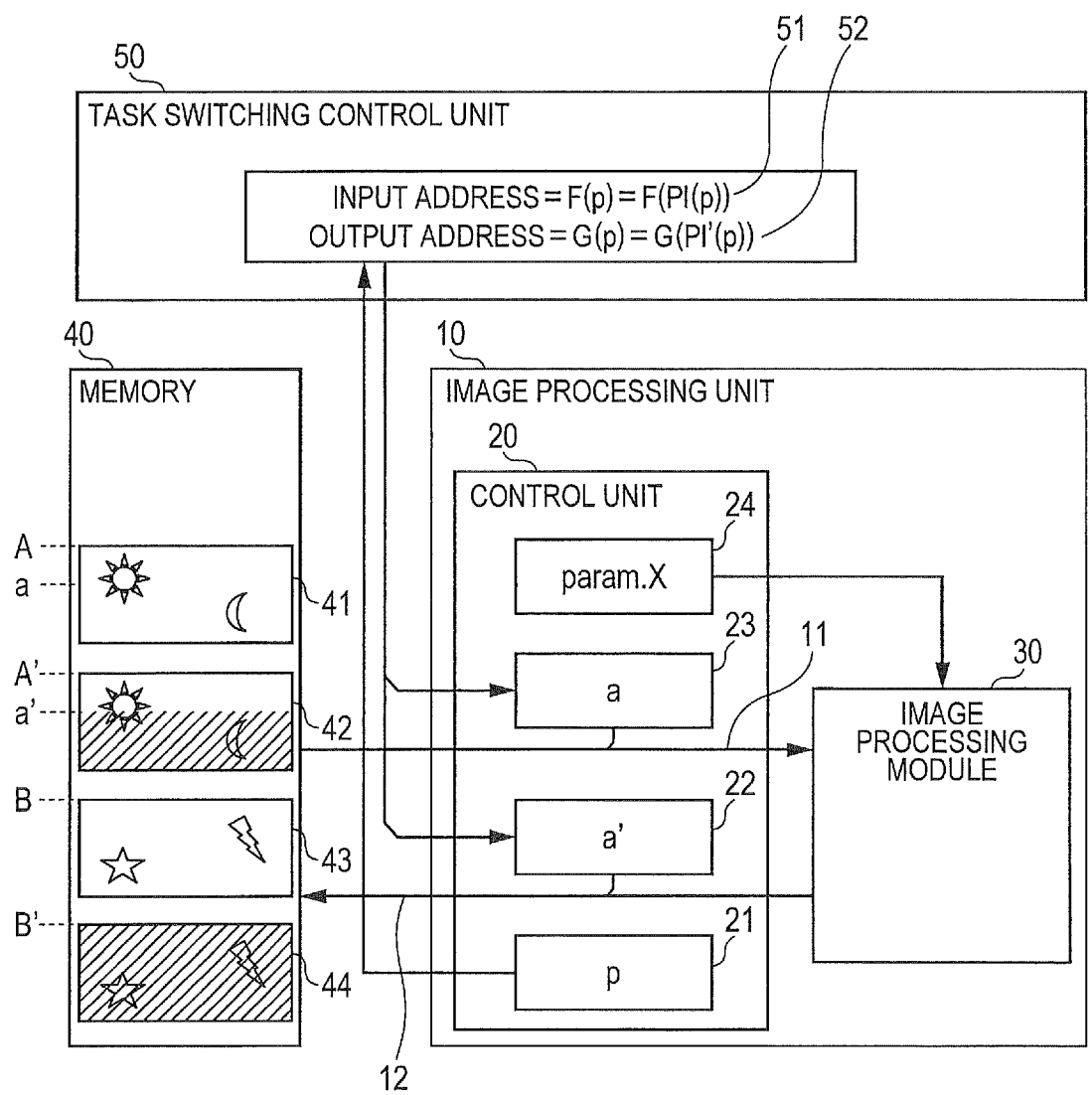
FIG. 5 is an explanation diagram showing the state of a signal processing unit before task switching.

FIG. 5 is an explanation diagram showing the state of the signal processing unit before task switching. FIG. 6 is an explanation diagram showing the state of the signal processing unit which is executing priority processing after task switching. FIG. 7 is an explanation diagram showing the state of the signal processing unit after completion of and return from priority processing.

Figure 6:
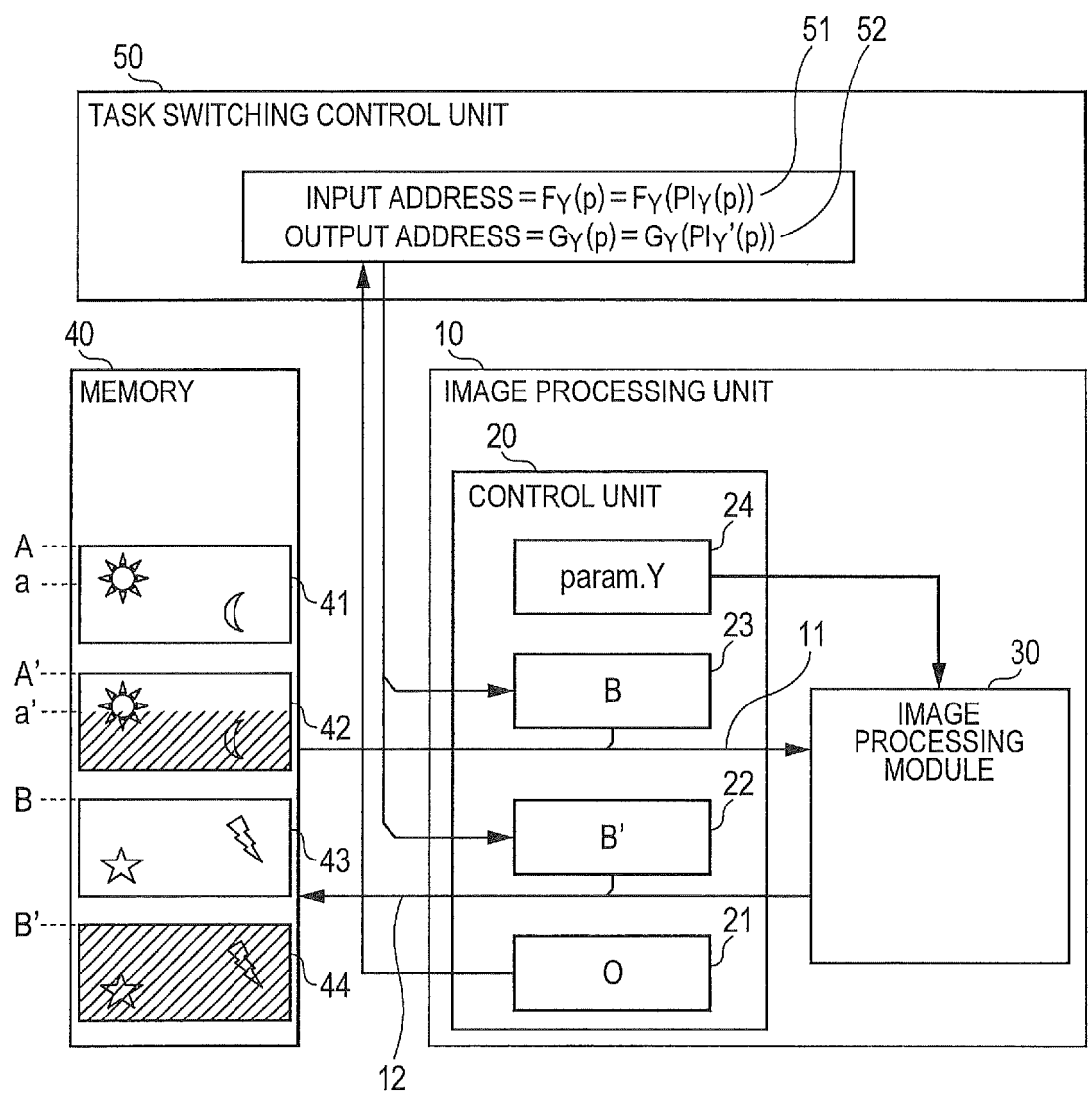
FIG. 6 is an explanation diagram showing the state of the signal processing unit which is executing priority processing after task switching.
Figure 7:
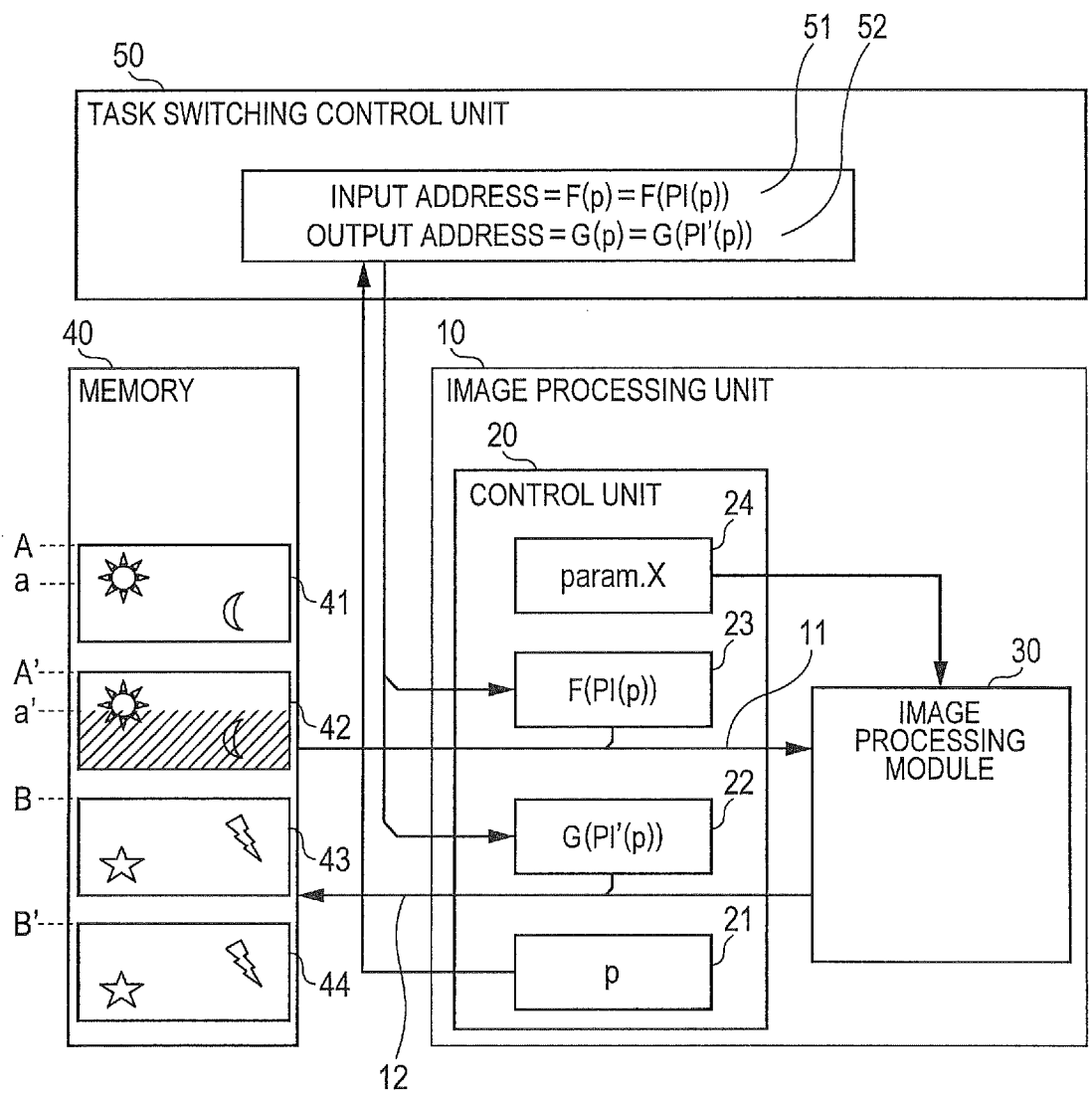
FIG. 7 is an explanation diagram showing the state of the signal processing unit after completion of and return from priority processing.

In the example of FIGS. 5 to 7, the signal processing unit 10 is particularly an image processing unit 10 for performing image processing, which includes an image processing module 30 for executing image processing and the control unit 20 including a parameter register 24 for holding a parameter indicating the content of the image processing, and the task switching control unit 50 includes a read address function 51 for calculating a read address and a write address function 52 for calculating a write address.

Description will be made on an example of occurrence of task switching for priority processing of image processing Y during the execution of image processing X. Input data 41 is stored with an address A of the memory 40 as a head, and output data 42 is written with an address A' as a head. In the memory 40, input data 43 of image processing Y is stored with an address B as a head, and a memory area for storing output data 44 of image processing Y with an address B' as a head is reserved. The respective values of the read (input) address register 23 and the write (output) address register 22 are varied in accordance with the progress of image processing. The pointer register 21 stores a pointer value indicating the progress of image processing. It is possible to use, as the pointer value, a line number of a line whose image processing and output are completed, a block number, a frame number, or the like. The line number is suitable for processing performed in units of lines, and the block number is suitable for block processing.

FIG. 5 shows a state at the time of reception of a priority processing request for the image processing Y. A parameter X for the image processing X is stored in the parameter register 24, the pointer register 21 indicates that the image processing X has completed the outputs of p lines, the value of the read address register 23 is an address a of the input data at this time, and the value of the write address register 22 is an address a' of the output data at this time.

Upon reception of a priority processing request, the priorities of the running image processing X and the requested image processing Y are compared as described in steps 81 to 83 in FIG. 3. If it is determined that the second task has a higher priority, the task switching control unit suspends the image processing X and saves the value p of the pointer register 21 (step 84 in FIG. 3). At this time, only the pointer value p is saved, but the value a of the read address register 23, the value a' of the write address register 22, and the parameter X of the parameter register 24 are all discarded. These values and various values for holding internal information in the image processing module 30 and the progress of the image processing X are not saved at all, and information to be saved is only the pointer value p. This enables an extremely short time of suspension processing.

Next, as shown in FIG. 6, for the image processing Y, a parameter Y is set in the parameter register 24, the address B for storing the head data of the input data 43 is set in the read address register 23, the address B' to store the head data of the output data 44 is set in the write address register 22, and the pointer register 21 is initialized to 0. Depending on the content of the image processing, a data processing sequence may be different from a storage sequence. In this case, the addresses of data to be inputted and outputted first can be set in the read and write address registers 23 and 22, and the pointer also can be set as appropriate in accordance with the processing content such that the pointer is sequentially decreased from the end as well as sequentially increased from zero.

By specifying an address b by the read address register 23, the input data 43 is sequentially read from the memory 40 to the image processing module 30, and processed. By specifying an address b' in the write address register 22, the processing result is outputted. In the meantime, the pointer register 21 stores a pointer value indicating the progress of the image processing Y.

Upon completion of the task of the image processing Y, return processing to the suspended image processing X is performed as shown in FIG. 7. The pointer value p is returned to the pointer register 21. The address of data to be outputted first after the resumption of the image processing X is set in the write address register 22, and the address of data to be inputted first after the resumption of the image processing X is set in the read address register 23. These addresses are calculated by inputting the pointer value p to the read address function 51 and the write address function 52 in the task switching control unit.

In this example, since the pointer value p is the number of lines whose outputs are completed before suspension, as for the write address, by adding addresses for storing output data corresponding to the number of lines of the pointer value p to the address A' of head output data, an address to store data outputted first after the resumption is obtained. The write address function 52 refers to the write address $G(p)=G(Pl'(p))$. Further, with the read address function 51, the read address $F(p)=F(Pl(p))$ is calculated and set in the read address register 23. In the equations, $Pl'(p)$ denotes a write image position function for calculating the line number of data to be outputted first after the resumption of the image processing X from the pointer value, and $Pl(p)$ denotes a read image position function for calculating the line number of data to be inputted first after the resumption of the image processing X from the pointer value. The write address can be calculated from the head address A' and the number of addresses per line, and the read address can be calculated from the head address A and the number of addresses per line. The number of addresses per line refers to a memory stride size, which does not necessarily match the number of data items per line of the image. To facilitate the calculation of address values for storing data of neighboring pixels at the time of allocating image data in the memory, a value that is larger than the number of data items per line of the image and aligns each line address is often used as the stride size. In this case, there is a stride-size difference between the addresses of a pixel and its vertically neighboring pixel.

The read image position function $Pl(p)$ and the write image position function $Pl'(p)$ specify image positions by line numbers or the like of the image input data 41 and the image output data 42, respectively. In this example, the write image position function $Pl'(p)=p+1$. Since the pointer value p is the number of lines whose outputs are completed before suspension, the output is resumed from the next line after the resumption. If data to be outputted first after the resumption of the image processing X is determined, it is possible to calculate the amount of previous input data to be inputted to obtain the output data in the image processing X. By obtaining this beforehand, the read image position function $Pl(p)$ is defined. For example, in the case of spatial filtering, it is possible to determine the number of previous lines to be inputted in accordance with the number of taps. Although examples of spatial filtering, flip-vertical processing, and blending will be described later, it is possible to determine the amount of previous input data to be inputted in accordance with the content of the image processing; therefore, the read image position function $Pl(p)$ can be defined based thereon.

The read address function $F(p)$ and the write address function $G(p)$ convert the outputs of the read image position function $Pl(p)$ and the write image position function $Pl'(p)$ into actual addresses in the memory, respectively.

The parameter X for allowing the image processing module 30 to execute the image processing X is set again in the parameter register 24. The parameter is a value specific to image processing and independent of the progress of processing. For example, in the case of image spatial filtering, the parameter is the number of taps or a filter coefficient. At the time of returning to the image processing X, in such a way as to transfer a value held beforehand in a program as with the start of the image processing, the same value can be set again to the parameter.

Thus, even though the saved data is only the pointer value p, it is possible to appropriately set post-resumption values in the write address register 22, the read address register 23, and the parameter register 24.

However, it is not possible to obtain from the pointer value the type of the parameter to be set again in the parameter register. This is because the pointer value indicates the progress of the suspended image processing and the parameter indicates the content of the image processing independent of the progress so that it is not necessary to save the parameter, which is the essence of this embodiment. Accordingly, it is also effective to define a context number indicating the parameter of image processing to be set again in the parameter register at the time of the resumption and save it together with the pointer value. Such an embodiment will be described later.

While the read address function 51 and the write address function 52 are represented by the image position functions in this embodiment, the image position functions do not necessarily need to be used if the input and output addresses to be resumed can be calculated based on the pointer value. While addresses for storing input/output data are dependent on hardware environment for executing image processing tasks; by using the image position functions for the position of the input data, the position of data under arithmetic operation, and the position of the output data, the progress of the image processing is represented by the position of image data in each stream, which can make the image position functions independent of hardware environment. This simplifies address calculation by the task switching control unit. For example, in the case of porting software for describing image processing tasks to other hardware environment, matching can be performed on only information about how input/output data is mapped in the memory, such as a head address for storing data and the amount of data per line. Further, in the case where the image processing module 30 executes a plurality of pieces of image processing, representation by respective image position functions and input/output address functions simplifies address calculation. The execution of a plurality of pieces of image processing will be described in a fifth embodiment.

The effect of the signal processing device according to the first embodiment will be described.

Figure 8:
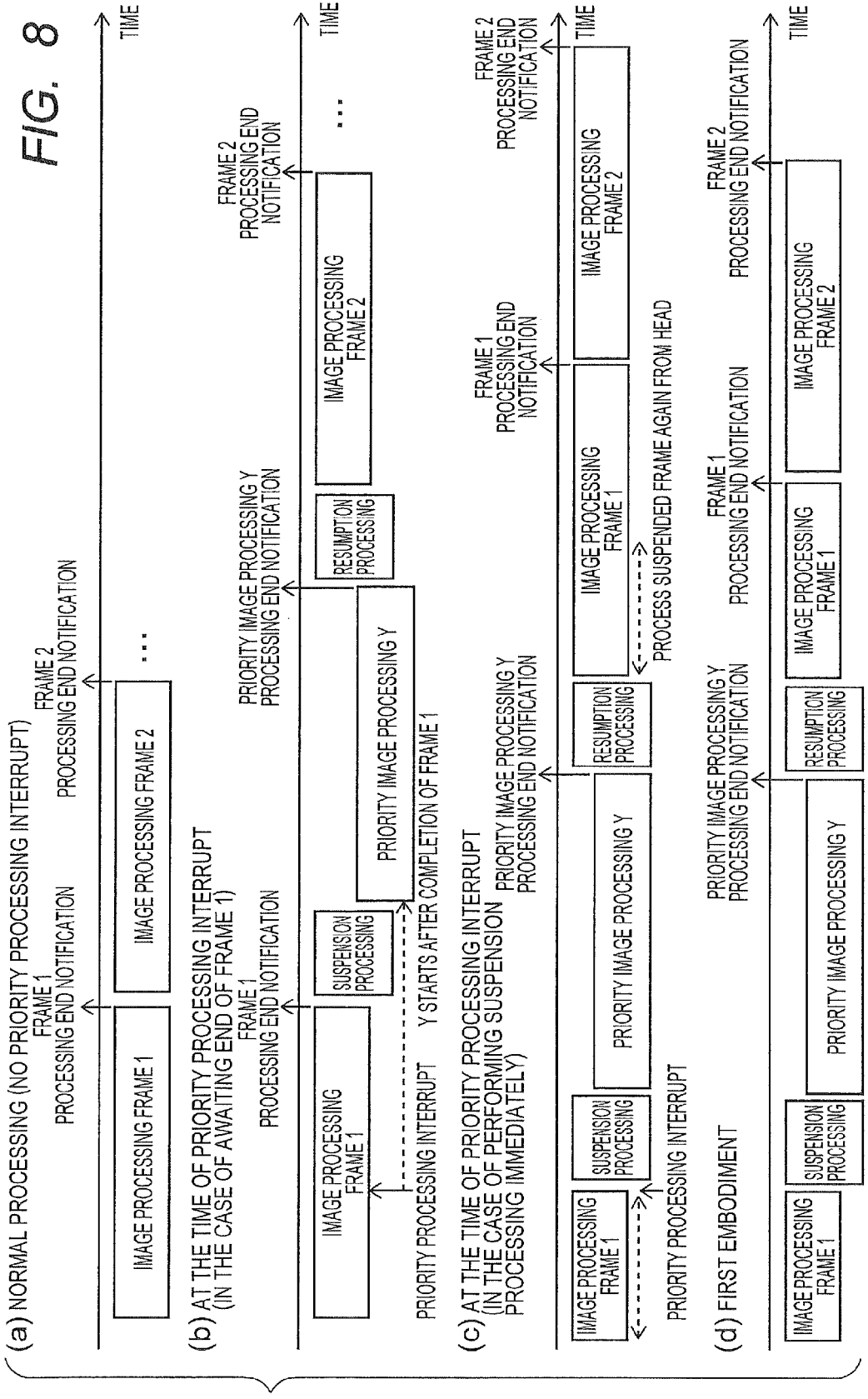
FIG. 8 is an explanation diagram showing the effect of task switching according to the first embodiment.

FIG. 8 is an explanation diagram showing the effect of task switching according to the first embodiment. The lateral axis indicates the time, representing the flow of image processing. Case (a) shows normal processing without an interrupt for requesting priority processing. In this example, a processing task is executed every image frame. Upon the end of the task, the end of frame processing is notified to software such as an OS for managing the image processing. In the related art, there can be two methods for responding an interrupt for requesting priority processing of another image processing task during processing of a frame 1. Case (b) shows a case where the task of the priority image processing Y is started after the end of the frame 1. Case (c) shows a case where the processing of the frame 1 is suspended immediately to start the task of the priority image processing Y, and after the end of Y, the processing is resumed returning to the head of the frame 1.

In case (b), suspension processing is performed after the end of the frame 1, and then the task of the priority image processing Y is executed. After the completion of the priority processing, the image processing before the suspension is resumed from the head of a frame 2 subsequent to the already finished frame 1. Since the processing of the frame 1 is not suspended in midstream, information to be saved is only the information on the completion of the frame 1, and since the processing can be resumed from the frame 2 subsequent to the completed frame 1, there is no information to be returned. However, there is a problem that the start of the priority image processing Y is delayed until the end of the current frame processing.

On the other hand, in case (c), the processing of the frame 1 is forcibly suspended. Information such as the progress of arithmetic operation is all discarded, and the priority image processing Y is executed. This solves the problem that the start of the priority image processing Y is delayed until the end of the current frame processing. However, if information about the progress of the suspended processing of the frame 1 is not saved, the processing has to be performed again from the head of the frame 1 at the time of the resumption; accordingly, the processing of the frame 1 executed before the priority processing interrupt is wasted.

Signal processing including image processing deals with an enormous amount of data, which leads to an enormous amount of data about the progress of processing in comparison with ordinary software. For example, in the case of 3×3 image spatial filtering, to calculate data on a center pixel, data on eight surrounding pixels is required to be inputted. The greater the number of taps is, the more data items need to be inputted. In this case, if all data in process is required to be saved as in the context switch of ordinary software; after suspension after an arithmetic operation on a pixel, to resume from the next pixel, all of pixel data inputted already and referred to in a future task as well as surrounding pixel data necessary for input is required to be saved. This obviously leads to an enormous amount of data to be saved, in comparison with ordinary software. Therefore, it is not realistically permissible to save all information about the progress of processing in the same way as the context switch of ordinary software, and in the related art, case (b) or (c) is adopted for priority processing.

In this embodiment, the saved data is only the pointer value p, and the pointer value is the line number of output data which has been outputted by the image processing unit. Since only the necessary read address and write address are calculated from the saved pointer value p and set in the address registers 22, 23 and the parameter register 24 is set again at the time of return, as shown in case (d) a time required for suspension processing and resumption processing is extremely short as in cases (b) and (c). Since as in case (c), in the middle of the image processing of the frame 1 after the priority processing interrupt, the suspension processing is performed and immediately the priority image processing Y is started, the start of the priority image processing Y is not delayed as in case (b), and the processing is resumed from the line subsequent to the outputted pth line of the frame 1 instead of returning to the head of the frame as in case (c) after the resumption processing; accordingly, the already executed processing is not wasted.

While the pointer value is the line number of the outputted line as described in this embodiment, the pointer value may be a pixel number, a line number, a block number, a frame number, or a combination thereof, in the output stream. Alternatively, the pointer value may be a pixel number, a line number, a block number, a frame number, or a combination thereof, in the input stream of inputted input data instead of output.

In signal processing including image processing, input data is sequentially inputted, arithmetic processing is performed thereon, and output data is sequentially outputted. Although in task switching it is ideal to save and return all information about the progress of arithmetic operation, this is not realistically permissible as described above. The present inventors have found that the progress of arithmetic operation can be reproduced by inputting a certain amount of previous input data again. By saving only the pointer value indicating the progress of image processing, obtaining the position of data to be outputted next based on the pointer value at the time of return, and resuming the processing returning to the head of all input data necessary to calculate the output, it is possible to reproduce the progress of suspended processing with the progression of a image processing task after resumption, calculating the data to be outputted next, and resuming the image processing from a suspended position in a seamless manner.

Further, although it is sufficient to save only the pointer value, it is also possible to further save, e.g., a context number indicating the content of image processing to be resumed. The pointer value and the context number have limited values which require only 1 to 2 bytes at most. It is sufficient to save an extremely small amount of information in comparison with saving all information about the progress of image processing.

Second Embodiment

Spatial Filtering (FIR Filter)

Description will be made of an embodiment in which image processing executed by the image processing module 30 is image spatial filtering. The image position functions in the first embodiment corresponding to spatial filtering are used, and the other configuration and operation are the same as those of the first embodiment.

Figure 9:
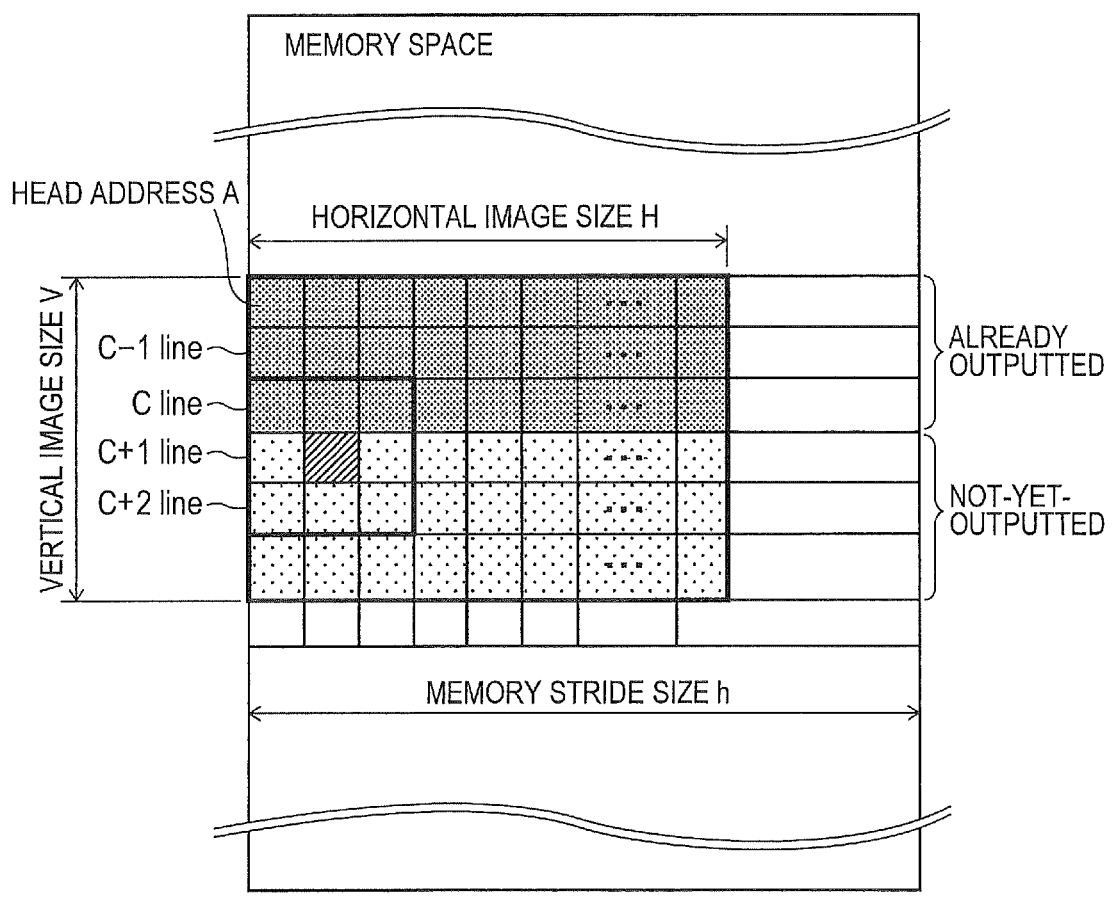
FIG. 9 is an explanation diagram showing the concept of image position functions corresponding to spatial filtering.

FIG. 9 is an explanation diagram showing the concept of the image position functions corresponding to spatial filtering. Spatial filtering represented by a 3×3 FIR filter is performed on image data of a horizontal size H and a vertical size V, and image data of the same size is outputted. The H×V input image data is stored in the memory 40 with the head address as A, and outputted with the address A' as a head. The horizontal size H of the image may be equal to or different from a memory stride size h. Since the input data 41 and the output data 42 have the same structure with different head addresses, FIG. 9 illustrates only the input data 41, and does not show the output data 42.

The FIR filter is an abbreviation for "Finite Impulse Response Filter". To obtain the value of a pixel, the FIR filter multiplies data on pixels surrounding the pixel by a predetermined coefficient for weighting addition. The 3×3 FIR filter uses data on eight pixels surrounding a center output pixel. With an image data plane, the FIR filter calculates output data on the center pixel in an input area of a 3×3 square. A 5×5 FIR filter inputs data within the range of two pixels away from the center, and a 7×7 FIR filter inputs data within the range of three pixels away from the center. A size of 3×3, 5×5, or 7×7 is called the number of taps or the order.

Assume that when the output of the Cth line from the head is completed, priority processing is requested and spatial filtering is suspended. At this time, the pointer value p is C, and the task switching control unit 50 saves this value. At this point, the readout of the (C+1)th line is completed by the read address register. This is because since the 3×3 FIR filter inputs and calculates data on all eight surrounding pixels to obtain output pixel data, the completion of the Cth line output signifies the completion of the (C+1)th line input.

Upon completion of and return from the priority processing, the output is resumed from the (C+1)th line subsequent to the Cth line whose output is completed before the suspension. Therefore, the write image position function $Pl'(p)=p+1$. The Cth line input data is the head data of necessary data to calculate the (C+1)th line data. Therefore, the read image position function $Pl(p)=p$. In this case, the read address function $F(p)=A+(p-1)\times h$, and the write address function $G(p)=A'+p\times h$, where h denotes a memory stride size.

While FIG. 9 illustrates the spatial filtering by the 3×3 FIR filter, generally in the case of spatial filtering by the N×N (N is an odd number) FIR filter, the write image position function $Pl'(p)=p+1$, and the read image position function $Pl(p)=(p+1)-(N-1)/2$. Since the output is resumed from the line subsequent to the saved pointer value, the write image position function is the same as in the spatial filtering by the 3×3 FIR filter. The read image position function is defined as above because data on the previous $(N-1)/2$ lines needs to be inputted to obtain the (p+1)th line output.

In the case of the spatial filtering by the 3×3 FIR filter, data on (C+1) lines has been inputted to the image processing module 30 at the time of the completion of the Cth line output and the suspension. In the same method as the context switching of ordinary software, input is resumed from the (C+2)th line to resume output from the (C+1)th line. However, to implement this, it is necessary to save all data on the Cth and (C+1)th lines already inputted to the image processing module 30. The horizontal size of the image is 640 pixels in VGA and is increasing to 800 to 1024 pixels by higher definition. In the case of 8 bits of brightness data per pixel, one line of data comes to about 1 Kbyte, so that two lines of data amount to about 2 Kbytes per color and reach about 6 Kbytes in three colors. As the number of filter taps increases, the number of lines of data to be saved increases, which leads to an enormous amount of data to be saved. It is not practically permissible to save image processing data.

In this embodiment, instead of saving and returning two lines of input data, these lines of data are inputted again. Accordingly, the input is resumed from the Cth line instead of the (C+2)th line. Therefore, data to be saved is only the pointer value. In this embodiment, the pointer value is the line number which requires only two bytes at most.

As described above, the pointer is the number of lines whose outputs are completed; however, the pointer may be the number of lines whose inputs are completed. In this case, the input image position function $Pl(p)=p-2$, and the output image position function $Pl'(p)=p-1$.

In this embodiment, when priority processing is requested in the middle of a line, suspension processing is performed after the completion of processing of the line, or the processing of the line is forcibly ended and suspended and the processing is resumed from the beginning of the line after resumption. For further improvement, in order to suspend and resume the processing in the middle of the line, the pointer can be comprised of the number of lines and the number of pixels. In the same manner, the data to be saved and returned is only the pointer value, but the pointer includes not only the number of lines but also the number of pixels, which leads to a larger amount of data to be saved and returned, but makes it possible to start the priority processing without awaiting the end of the line processing or resume from the middle of the line processing without discarding the progress of the processing. This makes it possible to further suppress temporal overhead required for save and return to perform task switching.

On the periphery part of a H×V rectangle image, if an originally necessary pixel corresponds to the outside of the H×V rectangle, data to be inputted cannot be obtained. In this case, well-known image edge processing in image spatial filtering in general can be applied to this embodiment as well.

In this embodiment, the FIR filter is taken as an example of signal processing for inputting data on lines vertically neighboring a processing line. In scaling as well, data on lines vertically neighboring a processing line needs to be inputted for interpolation or decimation; accordingly, the image position functions and the address functions can be configured in the same manner.

Third Embodiment

Flip-Vertical Processing

Description will be made of an embodiment in which image processing executed by the image processing module 30 is image flip-vertical processing. The image position functions in the first embodiment corresponding to flip-vertical processing are used, and the other configuration and operation are the same as those of the first embodiment.

Figure 10:
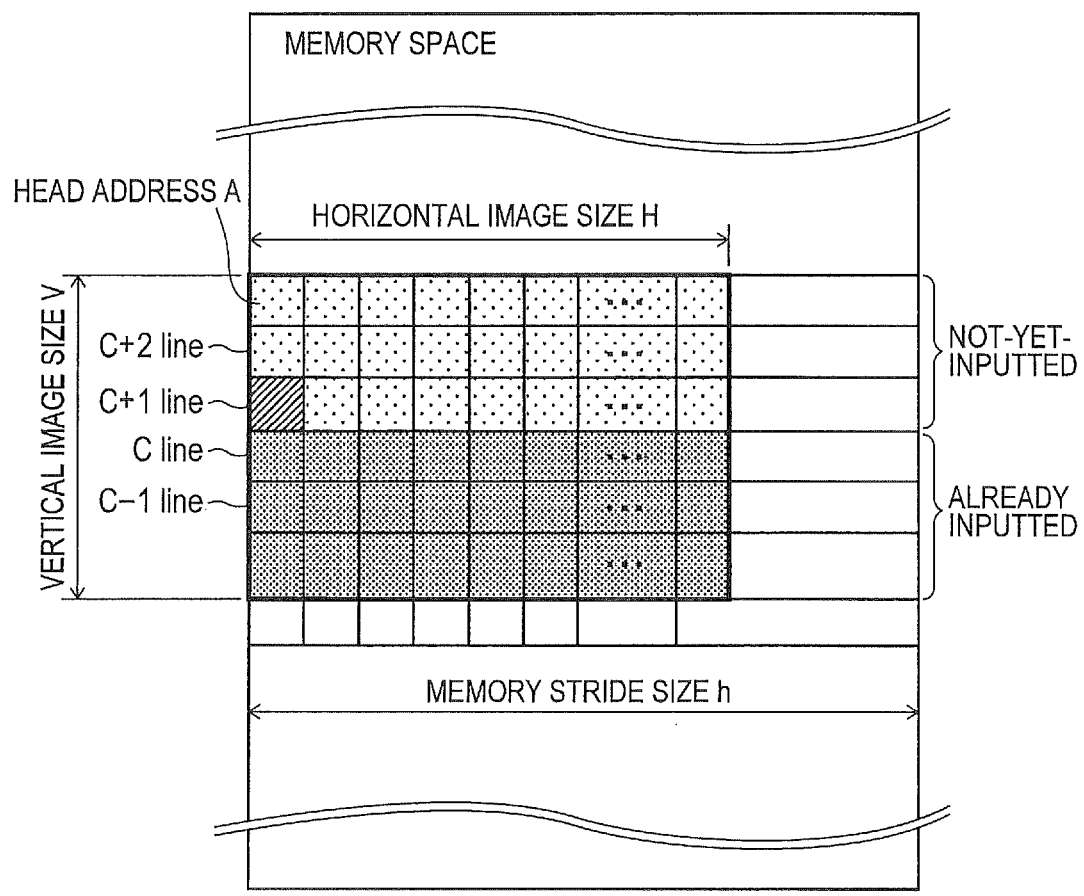
FIG. 10 is an explanation diagram showing the concept of image position functions corresponding to flip-vertical processing.

FIG. 10 is an explanation diagram showing the concept of the image position functions corresponding to flip-vertical processing. Flip-vertical processing is performed on image data of the horizontal size H and the vertical size V, and image data of the same size is outputted. The H×V input image data is stored in the memory 40 with the head address as A, and outputted with the address A' as a head. The horizontal size H of the image may be equal to or different from the memory stride size h. Since the input data 41 and the output data 42 have the same structure with different head addresses, FIG. 10 illustrates only the input data 41, and does not show the output data 42.

The flip-vertical processing includes a way of inputting data in order from the top and outputting data in order from the bottom and a way of inputting data in order from the bottom and outputting data in order from the top. In the way of inputting data in order from the top and outputting data in order from the bottom, the processing can be started even if input is not completed down to the bottom. However, as for output, since the head data is outputted last, the next processing often cannot be started until the head data is outputted. On the other hand, in the way of inputting data in order from the bottom and outputting data in order from the top, the processing cannot be started until the input data is all inputted. However, since the output data is sequentially outputted from the head data, it is possible to start the next processing in sequence.

The embodiment of inputting data in order from the bottom and outputting data in order from the top will be described.

The pointer holds the number of outputted lines. If priority processing is requested when C lines from the bottom have been inputted and the C lines have been outputted, the saved pointer value p=C. In FIG. 10, a dark hatching portion is an inputted area in the input data 41. With the flip-vertical processing, the input data on the C lines from the bottom is outputted in the C lines from the top in the area with the address A' as a head (not shown).

Since the (C+1)th line data is to be outputted next after return, the write image position function Pl'(p)=p+1. In this case, the write address function G(p)=A'+p×h.

As for read image position function, since the C lines from the bottom have been inputted before suspension and the corresponding inverted outputs have been completed in the flip-vertical processing, the (C+1)th line from the bottom, which is the (V−C)th line in the memory, needs to be inputted after resumption. Therefore, the read image position function Pl(p)=V−p, and the read address function F(p)=A+(V−p−1)×h.

In this embodiment, the flip-vertical processing is taken as an example in which the sequence of a line required for a processing line differs from that of the processing line. In flip-horizontal processing and rotation processing as well, the image position functions and the address functions can be configured in the same manner.

If a symmetry axis is not at the center of the screen in the flip-vertical processing and the flip-horizontal processing or image end processing is required in the rotation processing, well-known image edge processing can be applied to this embodiment as well.

Fourth Embodiment

Blending

Description will be made of an embodiment in which image processing executed by the image processing module 30 is the blending of a plurality of images. The image position functions in the first embodiment corresponding to blending are used, and the other configuration and operation are the same as those of the first embodiment.

Figure 11:
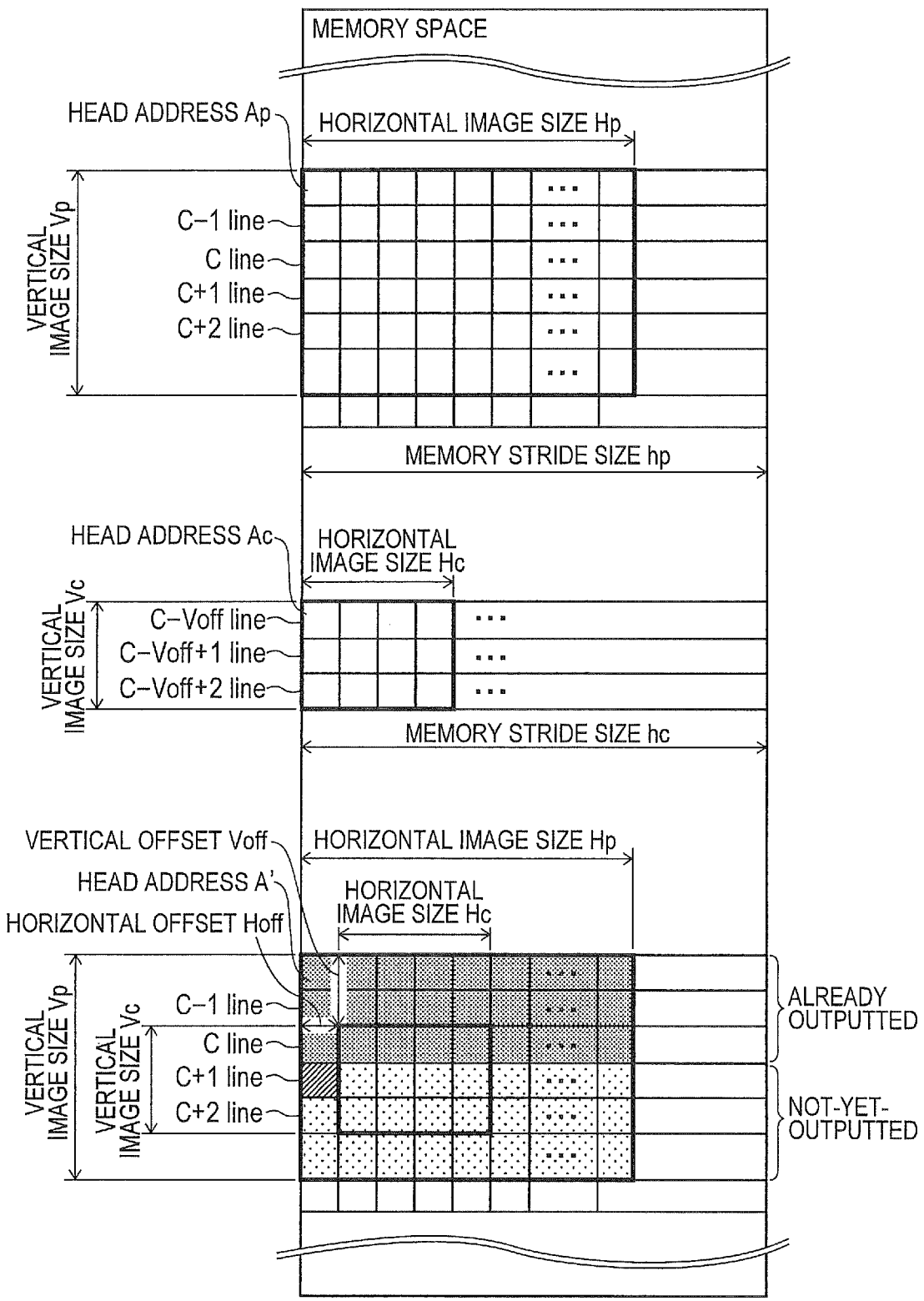
FIG. 11 is an explanation diagram showing the concept of image position functions corresponding to blending.

FIG. 11 is an explanation diagram showing the concept of the image position functions corresponding to blending.

For the sake of simplicity, the synthesis of two images will be described. An Hp×Vp parent screen stored in the memory 40 with an address Ap as a head and a Hc×Vc child screen stored with an address Ac as a head are synthesized, and the synthesized image is outputted with an address A' as a head. The memory stride sizes of the parent screen, the child screen, and the output image are denoted by hp, hc, and h, respectively. The synthesized image is obtained by substituting the Hc×Vc child screen for an area with the addition of a horizontal offset Hoff and a vertical offset Voff from the top-left of the Hp×Vp parent screen.

The pointer holds the number of outputted lines. If priority processing is requested when C lines are outputted, the saved pointer value p=C.

Since the (C+1)th line data is to be outputted next after return, the write image position function Pl'(p)=p+1. In this case, the write address function G(p)=A'+p×h.

As for read image position functions, Plp(p) for the parent screen and Plc(p) for the child screen are defined. As for read address functions, Fp(p) for the parent screen and Fc(p) for the child screen are defined.

The (C+1)th line output in the synthetic image requires the (C+1)th line input from the parent screen; therefore, Plp(p)=p+1, and the address function Fp(p)=Ap+p×hp.

The (C+1)th line output in the synthetic image requires the (C−Voff+1)th line input from the child screen if C−Voff≥0; therefore, Plc(p)=p−Voff+1, and the address function Fc(p)=Ac+(p−Voff)×hc. If C−Voff<0, the child screen does not overlap with the parent screen; therefore, it is not necessary to input data on the child screen.

Thus, in the case of inputting a plurality of images, read image position functions and read address functions are prepared for respective input images.

Fifth Embodiment

Combination of a Plurality of Pieces of Processing

Description will be made of an embodiment in which image processing executed by the image processing module 30 is a combination of a plurality of pieces of image processing. The image position functions in the first embodiment corresponding to a plurality of pieces of image processing are used, and the other configuration and operation are the same as those of the first embodiment.

While there are various combinations of a plurality of pieces of image processing, description will be made of continuation processing for executing the image processing X on an input image and executing the image processing Y on its output to obtain an output image.

In the output image, the pointer value p is the line number of the outputted line and is saved in suspension processing. The (p+1)th line is a line to be outputted first after return. In the image processing Y, an image position function Ply(p) is defined so as to input a line number to be outputted and output the line number of the head of the necessary input data. At this time, in the image processing X in the preceding stage, an image position function Plx(p) is defined so as to input the line number of the head of the input data that the image processing Y needs first, namely Ply(p), and output the line number of the head of the necessary input data.

The address function F(p) is defined so as to provide an address, in the memory, of data specified by Plx(p). Letting A' denote the head address of the output image and h denote the memory stride size, the address function F(p) can be defined as follows: F(p)=A'+(Plx(Ply(p))−1)×h.

Since it is sufficient for the image position function and the address function to be able to calculate a proper address by synthesis, the input/output of the image position function can generally be defined to be the number of outputted lines, the number of inputted lines, a line number on an entire screen, or the like.

In the above combination, if the input image, the output image of X, the input image of Y, and the final output image all have the same size, and the inputs and outputs of the image position functions are all defined as line numbers from the head, the function coupling is simplified. That is, without performing processing such as offset between the image position functions of a plurality of pieces of image processing, the output of the image position function of the subsequent processing can be nested as the input of the image position function of the preceding processing, which is Plx(Ply(p)) for example in this embodiment. Even if the output of Ply(p) is defined as the number of lines from the head of the image, but if the input of Plx is defined as the number of lines from the bottom of the image, Plx(Ply(p)) cannot be simply adopted. Therefore, it needs to be corrected to, e.g., Plx(V−Ply(p)), using the vertical size V of the image.

As described above, the pointer is the line number of the outputted line; however, even with the pointer implemented by another method indicating the progress of image processing, this embodiment is also applicable. Even if the pointer is a pixel number, a block number, a frame number, or a combination thereof as well as the line number; by defining the image position function in the same way and obtaining a post-return input start address, the same effect can be obtained. Further, even if the inputs and outputs of the image position functions are not all defined as line numbers and a function using a pixel number, a block number, a frame number, or a combination thereof is included, adjustment can be made when the output of the image position function of the subsequent processing is nested as the input of the image position function of the preceding processing. Based on the saved pointer value, in order that the post-return output can resume from the suspended point, the head of input data necessary to calculate the output is calculated in sequence, and the address, in the memory, of the data is specified to resume the input.

Therefore, the amount of information to be saved is only the pointer value which is the minimum necessary, an enormous amount of information is not saved and returned, and the position information of input data necessary to resume signal processing after return is calculated only from the pointer value, which makes it possible to suppress temporal overhead required for save and return.

Sixth Embodiment

Block Processing

In some type of image processing, an image is divided into square blocks, and processing is executed in units of blocks. For example, the discrete cosine transform is processing for executing a matrix operation generally on 8×8 pixel blocks and converting them into frequency domain data. The block form is generally a square, but is not limited thereto.

In the block processing as well, it is also possible to sequentially read data in units of lines as in the line processing and sequentially execute processing on blocks inputted to the image processing module. Although the image processing module needs to include a buffer for several blocks, read address control can be simplified. In this case, the pointer can be represented by the number of lines as described above. If the pointer is the line number even though internal processing is block processing, the first embodiment can be applied as it is.

In the case of input and output in units of blocks instead of lines, read and write address control becomes more complex, but does not require the internal buffer for holding not-yet-processed data because only necessary data is inputted to the image processing module. In this case, the pointer can be the block number of the inputted or outputted block.

Figure 12:
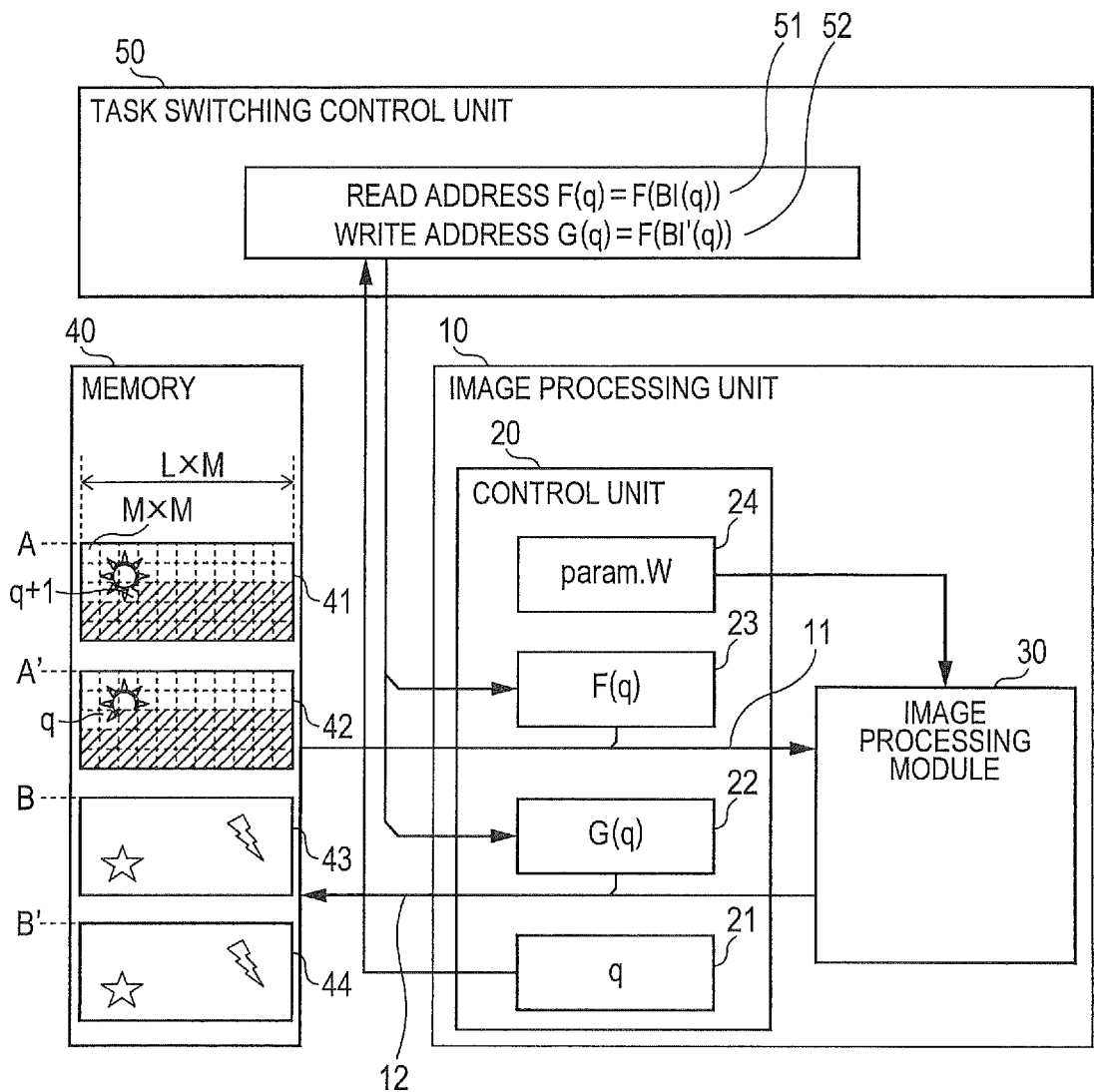
FIG. 12 is a diagram for explaining task switching in block processing.

FIG. 12 is a diagram for explaining task switching in block processing. A parameter W for instructing the image processing module 30 to perform block processing is stored in the parameter register 24 provided in the control unit 20 of the image processing unit 10. The input data 41 is stored in the memory 40 with the address A as a head, and the output data 42 is stored with the address A' as a head. A block size is M×M, and L blocks are stored in the lateral direction of the memory. The output data 42 is also stored in the memory in the same form.

The pointer holds the block number q of the outputted block, and at the time of a priority processing request and suspension, q blocks of the output data 42 have been outputted and (q+1) blocks of the input data 41 have been inputted. The task switching control unit saves the pointer value q and allows the execution of priority processing, and calculates read and write addresses based on the pointer value q upon the completion. Letting the block number q=i×L+j (0≤j<L) where i and j are integers, the head address of the block=A+i×L×M^2+(j−1)×M.

A block to be outputted first after resumption is the (q+1)th block. If q+1=i×L+j, the write address=A'+i×L×M^2+(j−1)×M. An input block necessary for output thereof is the (q+1)th block, and the read address=A+i×L×M^2+(j−1)×M.

Although the functions for obtaining addresses based on the block number are not simple, the concept is the same as that of the line number as the pointer. A block to be outputted first after resumption is obtained based on the saved pointer value q, and an address in the memory for storing the data is obtained from the position of an input block necessary for output thereof, and processing is resumed from the address.

Therefore, the amount of information to be saved is only the block number as the pointer value which is the minimum necessary, an enormous amount of information is not saved and returned, and the position information of input data necessary to resume signal processing after return is calculated only from the pointer value, which advantageously makes it possible to suppress temporal overhead required for save and return, in the same manner.

Further, the same concept can be applied to the combination of block processing and line processing.

Seventh Embodiment

Inter-Frame Processing

In some type of image processing, inter-frame data is referred to for execution of processing. For example, for motion compensation, a difference from a one-frame preceding image is obtained to calculate the presence or absence, direction, magnitude, etc. of motion.

Figure 13:
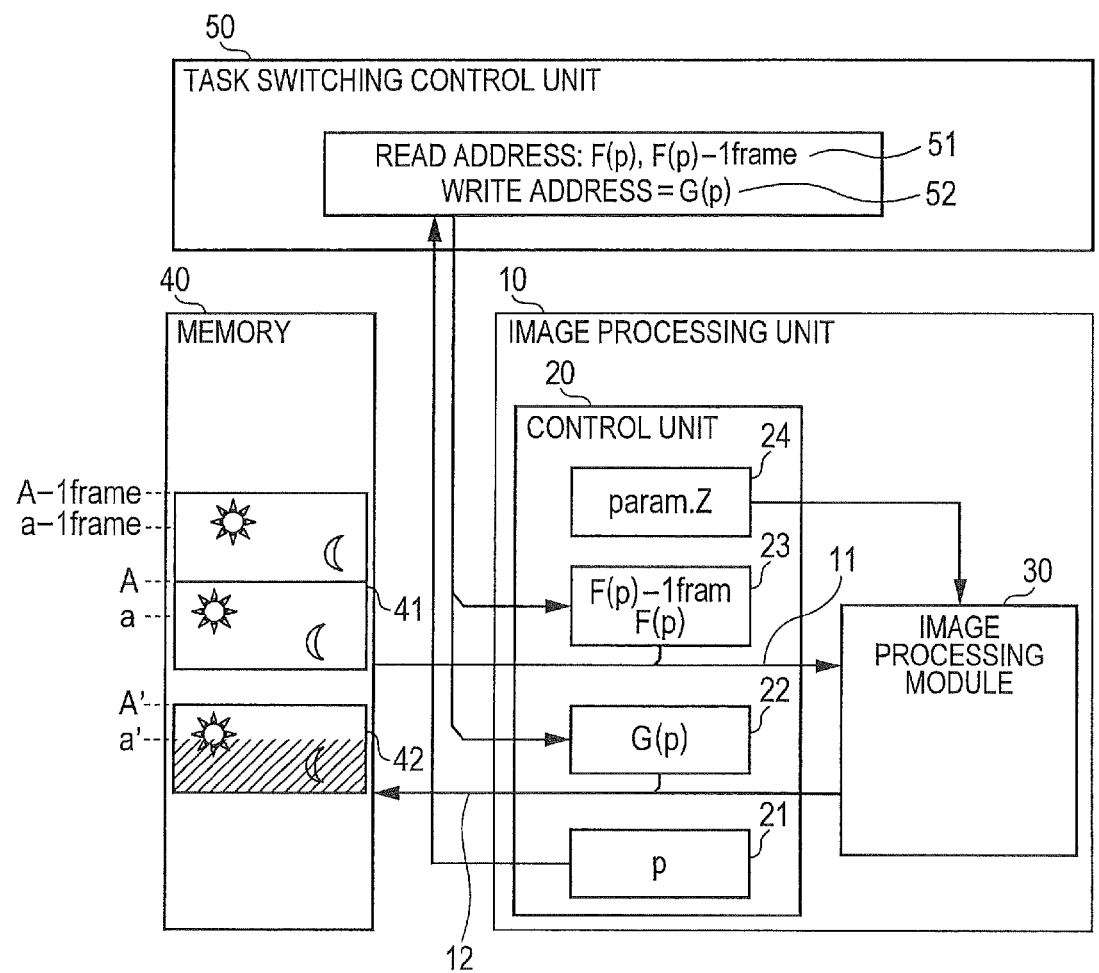
FIG. 13 is a functional block diagram of the signal processing device for performing inter-frame processing.

FIG. 13 is a functional block diagram of the signal processing device for performing inter-frame processing.

In the input data 41, in addition to a processing frame stored with the address A as a head, one-frame preceding data stored with an address A−1 frame as a head needs to be inputted to the image processing module 30. The output data 42 is written in the memory 40 with the address A' as a head. The pointer 21 holds, for example, the line number of the outputted line. In the same way, the pointer value p is saved at the time of suspension, the position of data to be outputted first after processing is resumed based on the saved pointer value p is obtained as the (p+1)th line, and the write address corresponding thereto is set. On the other hand, as for read addresses, respective image position functions and respective address functions for the processing frame and the one-frame preceding frame are defined, and respective read address registers for these frames are provided. In most cases, the processing image data and the one-frame preceding image data necessary for the processing have the same relative position in the frame; accordingly, the respective address functions etc. have a difference of just one frame.

Therefore, even in the inter-frame processing, the amount of information to be saved is only the pointer value. Since the pointer value can be the line number, the amount of information to be saved is the minimum necessary. In the same manner as in the other embodiments, an enormous amount of information is not saved and returned, and the position information of input data necessary to resume signal processing after return is calculated only from the pointer value, which advantageously makes it possible to suppress temporal overhead required for save and return. Further, this embodiment is also applicable to image processing using a plurality of frames of data for motion compensation, by preparing image position functions and address functions, respectively.

Eighth Embodiment

Multiple Priority Processing

Figure 14:
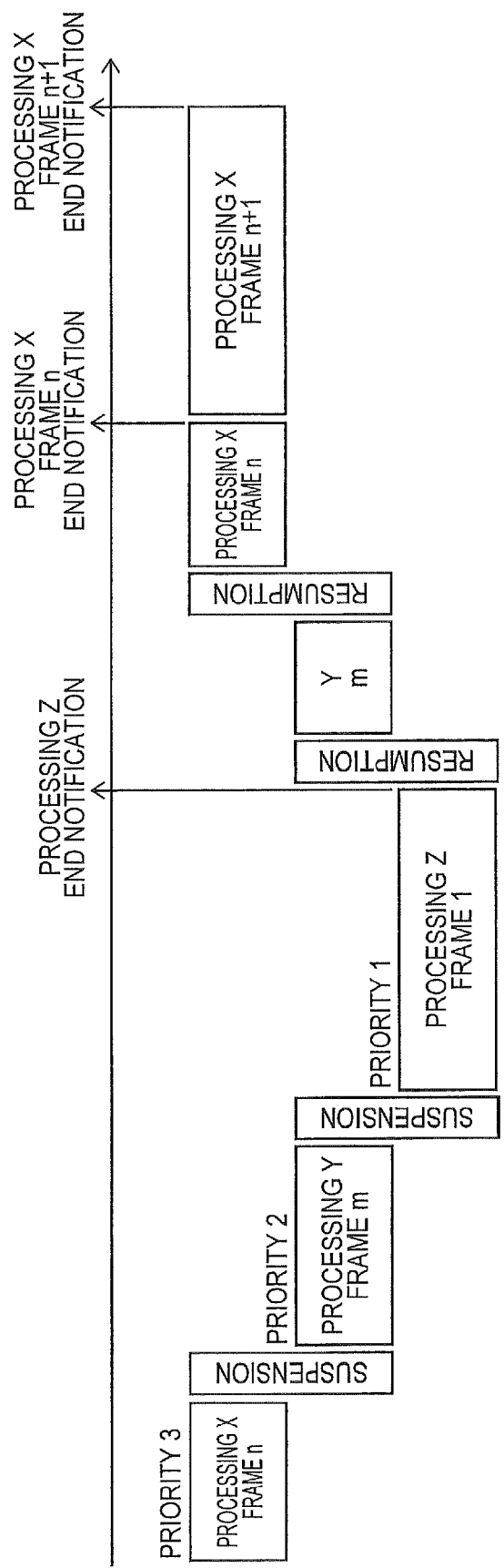
FIG. 14 is a diagram for explaining task switching performed by requesting further priority processing during priority processing.

FIG. 14 is a diagram for explaining task switching performed by requesting further priority processing during priority processing.

In FIG. 14, lower numbers indicate higher priorities.

Image processing X having priority 3 is started.

When processing Y having priority 2 is requested in the middle of the processing X, a pointer value Px indicating the line already processed in the processing X is saved, the processing X is suspended, the pointer is initialized, and then the processing Y is started.

Further, when processing Z having priority 1 is requested in the middle of the processing Y, a pointer value Py indicating the line already processed in the processing Y is saved, the processing Y is suspended, the pointer is initialized, and then the processing Z is started.

Upon completion of the processing Z, to resume the processing Y having the highest priority in the suspended processing, a resumption address is obtained from the saved pointer value Py and the processing is resumed.

Upon completion of the processing Y, to resume the last processing X, a resumption address is obtained from the saved pointer value Px and the processing is resumed.

The pointer value can be saved and returned to/from a well-known push-pop stack, for example.

While FIG. 14 illustrates two priority processing interrupts; even if three or more requests are made in midstream, multiple priority processing can be performed with one pointer in the same way by performing processing shown by the foregoing flowchart.

Ninth Embodiment

Semiconductor Device

Description will be made of an image processing system to which the signal processing device according to the first embodiment is applied. The image processing system can be implemented as a semiconductor device.

FIG. 2 is a block diagram of a semiconductor device 46 to which the signal processing device according to the first embodiment is applied.

The image processing unit 10 is coupled to an image input unit 63, an image output unit 64, a CPU 45, and the memory 40 via a bus 55. The CPU 45 functions as the task switching control unit 50 and also controls the whole system. The memory 40 is used to store image data used in the system. The image input unit 63 writes image data sent from an input device 61 such as a camera or television broadcasting to the memory 40 via a bus 55. The image processing unit 10 performs necessary image processing (scaling, image synthesis, filtering, etc.) on data inputted from the memory 40, and stores the processed image data into the memory 40 again. The image output unit 64 is an interface for output to a display device 62 such as an LCD, by which the processed image data is read from the memory 40, outputted outside the system, and displayed. The CPU 45 performs the above control with the collaboration of hardware and software.

Although the internal configuration is omitted in FIG. 2, the image processing unit 10 can be configured by the embodiments shown in FIGS. 1, 12, 13, etc. The image processing module can be configured by a plurality of pieces of hardware for performing a plurality of pieces of image processing, respectively. Alternatively, the image processing module may be implemented by one programmable accelerator, a combination thereof, or software operating on the CPU.

The function of the task switching control unit 50 in the embodiments shown in FIGS. 1, 12, 13, etc. can be implemented by the CPU 45. In suspension processing, the pointer value is read from the pointer register 21 and written to the memory 40. In resumption processing, the CPU 45 reads the pointer value from the memory 40 and substitutes it into the image position functions and the address functions to obtain post-resumption read and write addresses, which are set in the respective address registers 23 and 22. The pointer can be saved and returned, as in exception processing such as a normal interrupt, according to a well-known technique using a push-pop stack. Various image processing parameters are stored beforehand in the memory 40, and a parameter corresponding to the content of requested processing or processing to be resumed is read and set in the parameter register 24 of the image processing unit 10 to allow the image processing module 30 to execute the corresponding processing. Although it is sufficient to save only the pointer, it is also possible to further save a context number indicating the content of the suspended image processing. At the time of resumption, the context number of the suspended image processing as well as the saved pointer value is read to determine image processing content from the number so that a necessary parameter can be read from the memory 40 and set in the parameter register 24.

Since the parameter is a value specific to image processing content independent of the progress of processing and the progress of processing is indicated only by the pointer, it is not necessary to save the parameter value in suspension processing and it is sufficient to save only the pointer value, which makes it possible to suppress temporal overhead required for save and return. Further saving of the context number indicating the content of the suspended image processing makes it easier to set again a necessary parameter at the time of resumption.

Tenth Embodiment

Context Processing Unit

FIG. 15 is a block diagram of a semiconductor device including a context processing unit.

The semiconductor device includes the context processing unit 70 as the function of the task switching control unit 50 implemented by software of the CPU 45 in the ninth embodiment.

The context processing unit 70 includes a control unit 71, a context position storage unit 72, and a restoration unit 73. When priority processing is requested, the context position storage unit 72 reads the pointer value p and stores it in a storage unit 76, and also stores a context number 75 of suspended processing. The pointer value p and the context number 75 are associated with each other for storage. These values may be stored in a push-pop manner, or may be stored together with a control number indicating a stacked sequence.

When the priority processing is completed and the suspended processing is resumed, the restoration unit 73 obtains post-resumption read and write addresses based on the pointer value stored in the context position storage unit 72, and sets them in the read address register 23 and the write address register 22. Further, the restoration unit 73 determines the suspended processing content based on the context number 75, reads a corresponding parameter from a parameter group stored in the memory 40, and sets it in the parameter register 24. In parameter transfer from the memory 40, the context processing unit 70 may act as a bus master for direct memory access. Alternatively, the context processing unit 70 may store the parameter group in the restoration unit 73 beforehand for transfer, or may request the CPU 45 to perform such transfer control.

This makes it possible to reduce the load on the CPU 45 to perform task switching.

While the invention made above by the present inventors has been described specifically based on the illustrated embodiments, the present invention is not limited thereto. It is needless to say that various changes and modifications can be made thereto without departing from the spirit and scope of the invention.

For example, while signal processing is performed mainly on image signals in the embodiments, it is also possible to easily implement an embodiment in which time-series data as input data is sequentially inputted and undergoes predetermined processing, and time-series data of the same type as the input data is sequentially outputted. This is because when the sequentially output data is suspended by the priority processing, the position of output data necessary for seamless output following the suspension at the time of the return is obtained, and input is resumed returning to the head of all input data necessary to output the data.

What is claimed is:

1. A signal processing device comprising:
a signal processor that receives an input stream comprised of a plurality of pieces of input data, execute a predetermined task on stream data, and outputs an output stream comprised of a plurality of pieces of output data,
wherein input data of the input stream is sequentially inputted to the signal processor, and output data configuring the output stream is sequentially outputted from the signal processing unit,
wherein the signal processing device comprises a pointer indicating position information of data in the stream data according to progress of processing by the signal processor,
wherein when priority processing of a second task is requested during execution of a first task, the signal processing device executes the second task after saving a value held by the pointer, and
wherein upon completion of the second task, based on the saved pointer value the signal processing device obtains position information, in the output stream, of output data to be outputted next in the first task, and obtains position information, in the input stream, of head input data of all input data that needs to be inputted to the signal processor to calculate the output data to be outputted next.

2. The signal processing device according to claim 1, further comprising a memory for storing the input stream and writing the output stream and a task switching control unit,
the signal processor comprising an input address register and an output address register,
wherein the input address register holds an address, in the memory, of the input data which the signal processor reads, and the output address register holds an address, in the memory, of the output data which the signal processor writes,
wherein upon completion of the second task, the task switching control unit calculates position information in the output stream of the output data to be outputted next in the first task, with an output position function based on the saved pointer value, calculates an address in the memory of the output data to be outputted next, with an output address function based on an output of the output position function, and writes the address to the output address register, and
wherein the task switching control unit calculates position information in the input stream of the head input data, with an input position function based on the saved pointer value, calculates an address in the memory of the head input data, with an input address function, and writes the address to the input address register.

3. The signal processing device according to claim 2, wherein the stream data is image data, and the pointer holds a pixel number, a line number, a block number, a frame number, or a combination thereof in the output stream of output data which has been outputted by the signal processor,
wherein the output position function calculates a pixel number, a line number, a block number, a frame number, or a combination thereof of the output data to be outputted next in the first task based on the saved pointer value, and wherein the input position function calculates a pixel number, a line number, a block number, a frame number, or a combination thereof in the input stream of the head input data based on the saved pointer value.

4. The signal processing device according to claim 2, wherein the stream data is image data, and the pointer holds a pixel number, a line number, a block number, a frame number, or a combination thereof in the input stream of input data which has been outputted by the signal processor, wherein the output position function calculates a pixel number, a line number, a block number, a frame number, or a combination thereof of the output data to be outputted next in the first task based on the saved pointer value, and wherein the input position function calculates a pixel number, a line number, a block number, a frame number, or a combination thereof in the input stream of the head input data based on the saved pointer value.

5. The signal processing device according to claim 2, wherein the first task is a signal processing task including a plurality of pieces of signal processing in which an output stream obtained by performing signal processing on the input stream by the signal processor is an input stream of next signal processing in sequence, wherein each signal processing has a part position function for outputting position information of head input data of all input data that needs to be inputted to the signal processor to calculate output data to be outputted next, and wherein the saved pointer value is inputted to a part position function corresponding to signal processing executed last, in the first task, of the plurality of pieces of signal processing, and an output of a part position function corresponding to signal processing executed subsequently, in the first task, of the plurality of pieces of signal processing is inputted to a part position function corresponding to signal processing executed immediately previously, thus performing nesting in sequence to configure the input position function.

6. The signal processing device according to claim 5, wherein the stream data is image data, and signal processing performed by the signal processor is n×n spatial filtering (n is an odd number equal to or greater than three), wherein a part position function corresponding to the spatial filtering inputs a line number whose output is completed and outputs a line number (n−1)/2 line before the saved pointer value, and wherein the input position function includes the part position function corresponding to the spatial filtering.

7. The signal processing device according to claim 5, wherein the stream data is image data, and signal processing performed by the signal processor is flip-vertical processing of an image of a vertical size V for reading an input stream on the (V−n+1)th line from a head and outputting the input stream on the nth line from the head, wherein the pointer holds a line number p whose output is completed in the flip-vertical processing, and wherein a part position function corresponding to the flip-vertical processing outputs the (V−p)th line.

8. The signal processing device according to claim 1, wherein when priority processing of the second task is requested during execution of the first task, the signal processing device executes the second task after saving a first value held by the pointer, wherein when priority processing of a third task is requested during execution of the second task, the signal processing device executes the third task after saving a second value held by the pointer, wherein upon completion of the third task, based on the saved second value of the pointer the signal processing device obtains position information of output data to be outputted next in the second task and resumes the second task, and wherein upon completion of the second task, based on the saved first value of the pointer the signal processing device obtains position information of output data to be outputted next in the first task and resumes the first task.

9. The signal processing device according to claim 1, further comprising a non-transitory computer readable medium for storing the input stream and writing the output stream, wherein the signal processor it is coupled to the non-transitory computer readable medium through a bus.

10. A semiconductor device including a CPU (Central Processing Unit), a memory, and a signal processing unit that are coupled to a bus, the signal processing unit comprising:
a signal processing module; and
a signal processing control unit,
wherein the signal processing module receives an input stream comprised of a plurality of pieces of input data, executes predetermined signal processing on stream data, and outputs an output stream comprised of a plurality of pieces of output data,
wherein the signal processing control unit comprises a pointer indicating position information, in the stream data, of processing data according to progress of processing by the signal processing module, reads the input data from the memory by specifying a read address and inputs the input data to the signal processing module, and outputs the output data of the signal processing module to the memory by specifying a write address,
wherein when priority processing of a second task is requested during execution of a first task, the CPU allows the signal processing unit to execute the second task after saving a value held by the pointer, and
wherein upon completion of the second task, the CPU returns the saved pointer value, and based on the returned pointer value, obtains an address in the memory to store output data to be outputted next in the first task and sets the write address, and obtains an address for storing head input data of all input data that needs to be inputted to the signal processing unit to calculate the output data to be outputted next and sets the read address.

11. The semiconductor device according to claim 10, wherein the signal processing control unit comprises a read address register for holding the read address, a write address register for holding the write address, and a pointer register for holding the pointer value, wherein when the priority processing is requested, the CPU saves a first value of the pointer register into the memory, wherein upon completion of the second task, the CPU returns the first value from the memory to the pointer register, wherein the CPU calculates position information in the output stream of the output data to be outputted next in the first task, with an output position function based on the first value, calculates an address in the memory of the output data to be outputted next in the first task, with an output address function based on an output of the output position function, and writes the address to the write address register, and wherein the CPU calculates position information in the input stream of the head input data, with an input position function based on the first value, calculates an address in the memory of the head input data, with an input address function, and writes the address to the read address register.

12. The semiconductor device according to claim 10, wherein the signal processing control unit further comprises a parameter register, wherein the signal processing module executes signal processing in accordance with a parameter held by the parameter register, and wherein when the priority processing is requested, the CPU discards a value held by the parameter register without save, and writes a parameter for allowing the signal processing module to execute the second task to the parameter register.

13. The semiconductor device according to claim 12, wherein the memory stores the parameter for each processing content of processing executed by the signal processing module, and wherein when a processing task is requested, the CPU reads the parameter corresponding to processing content of the processing task from the memory, and writes the parameter to the parameter register.

14. A semiconductor device including a CPU (Central Processing Unit), a memory, a signal processing unit, and a context processing unit that are coupled to a bus, the signal processing unit comprising:
a signal processing module; and
a signal processing control unit, wherein the signal processing module receives an input stream comprised of a plurality of pieces of input data, executes predetermined signal processing on stream data, and outputs an output stream comprised of a plurality of pieces of output data, wherein the signal processing control unit comprises a pointer indicating position information, in the stream data, of processing data according to progress of processing by the signal processing module, reads the input data from the memory by specifying a read address and inputs the input data to the signal processing module, and outputs the output data of the signal processing module to the memory by specifying a write address, wherein the context processing unit comprises a context position storage unit and a restoration unit, wherein when priority processing of a second task is requested during execution of a first task, the context processing unit allows the signal processing unit to execute the second task after saving a value held by the pointer into the context position storage unit, wherein upon completion of the second task, the context processing unit returns the saved pointer value, and wherein based on the returned pointer value, the restoration unit obtains an address in the memory to store output data to be outputted next in the first task and sets the write address, and obtains an address for storing head input data of all input data that needs to be inputted to the signal processing unit to calculate the output data to be outputted next and sets the read address.

15. The semiconductor device according to claim 14, wherein the signal processing control unit comprises a read address register for holding the read address, a write address register for holding the write address, and a pointer register for holding the pointer value, wherein when the priority processing is requested, the context processing unit saves a first value of the pointer register into the context position storage unit, wherein upon completion of the second task, the context processing unit returns the first value from the context position storage unit to the pointer register, wherein the restoration unit calculates position information in the output stream of the output data to be outputted next in the first task, with an output position function based on the first value, calculates an address in the memory of the output data to be outputted next in the first task, with an output address function based on an output of the output position function, and writes the address to the write address register, and wherein the restoration unit calculates position information in the input stream of the head input data, with an input position function based on the first value, calculates an address in the memory of the head input data, with an input address function, and writes the address to the read address register.

16. The semiconductor device according to claim 14, wherein the signal processing control unit further comprises a parameter register, wherein the signal processing module executes signal processing in accordance with a processing parameter held by the parameter register, and wherein when the priority processing is requested, the restoration unit discards a value held by the parameter register without save, and writes a processing parameter for allowing the signal processing module to execute the second task to the parameter register.

17. The semiconductor device according to claim 16, wherein the memory stores the processing parameter for each content of processing executed by the signal processing module, and wherein when a task is requested, the restoration unit transfers the processing parameter corresponding to processing content of the task from the memory to the parameter register.

18. The semiconductor device according to claim 14, wherein when priority processing of a second task is requested during execution of a first task, the context processing unit associates and saves a context number of the first task with a value held by the pointer into the context position storage unit, wherein upon completion of the second task, the restoration unit sets the write address and the read address, based on the saved context number and the returned pointer value.

19. The semiconductor device according to claim 18, wherein the memory stores the processing parameter for each content of processing executed by the signal processing module, wherein upon completion of the priority processing, the restoration unit transfers the processing parameter corresponding to processing content of the first task from the memory to the parameter register, based on the saved context number.

20. The semiconductor device according to claim 19, wherein when priority processing of the second task is requested during execution of the first task, the context processing unit associates and saves a context number of the first task with a pointer value of the first task held by the pointer into the context position storage unit, wherein when priority processing of a third task is requested during execution of the second task, the context processing unit associates and saves a context number of the second task with a pointer value of the second task held by the pointer into the context position storage unit, wherein upon completion of the third task, the restoration unit returns the processing parameter of the second task and restores the pointer value of the second task, based on the context number of the second task, wherein upon completion of the second task, the restoration unit returns the processing parameter of the first task and restores the pointer value of the first task, based on the context number of the first task.

* * * * *